(12) United States Patent
Pearson et al.

(10) Patent No.: US 11,699,113 B1
(45) Date of Patent: Jul. 11, 2023

(54) SYSTEMS AND METHODS FOR DIGITAL ANALYSIS, TEST, AND IMPROVEMENT OF CUSTOMER EXPERIENCE

(71) Applicant: Sykes Enterprises, Incorporated, Tampa, FL (US)

(72) Inventors: David Pearson, Tampa, FL (US); J. Shelton Hook, Jr., Tampa, FL (US); Eric G. Palacio, Tampa, FL (US); Richard Sadowski, Tampa, FL (US); Stephen Berdy, Tampa, FL (US); Joseph Flaska, Tampa, FL (US); James Somers, Tampa, FL (US); J. Brooke Aker, Tampa, FL (US); John Romania, Tampa, FL (US); Martin Hendrickse, Tampa, FL (US); Donald Young, III, Tampa, FL (US); Al Ryan Santiago, Tampa, FL (US); John Kruper, Tampa, FL (US); Matthew Christensen, Tampa, FL (US); Ryan R. Cannon, Tampa, FL (US)

( * ) Notice: Subject to any disclaimer, the term of this patent is extended or adjusted under 35 U.S.C. 154(b) by 539 days.

(21) Appl. No.: 16/908,280

(22) Filed: Jun. 22, 2020

Related U.S. Application Data

(63) and a continuation-in-part of application No. 15/402,210, filed on Jan. 9, 2017, now abandoned.
(Continued)

(51) Int. Cl.
| | |
|---|---|
| *G06Q 10/0631* | (2023.01) |
| *G06Q 30/0201* | (2023.01) |
| *G06F 16/38* | (2019.01) |
| *G06F 16/35* | (2019.01) |
| *G06F 16/36* | (2019.01) |
| *G06Q 10/0639* | (2023.01) |

(Continued)

(52) U.S. Cl.
CPC ........... *G06Q 10/063112* (2013.01); *G06F 16/353* (2019.01); *G06F 16/355* (2019.01); *G06F 16/358* (2019.01); *G06F 16/367* (2019.01); *G06F 16/381* (2019.01); *G06N 3/08* (2013.01); *G06Q 10/06375* (2013.01); *G06Q 10/06393* (2013.01); *G06Q 10/06398* (2013.01); *G06Q 30/0201* (2013.01); *G06V 20/41* (2022.01)

(58) Field of Classification Search
None
See application file for complete search history.

(56) References Cited

U.S. PATENT DOCUMENTS

| | | | | |
|---|---|---|---|---|
| 2012/0130771 A1* | 5/2012 | Kannan | ............... | G06Q 30/0203 707/738 |
| 2014/0143018 A1* | 5/2014 | Nies | .................. | G06Q 30/0201 705/7.29 |

* cited by examiner

*Primary Examiner* — Kannan Shanmugasundaram
(74) *Attorney, Agent, or Firm* — Shumaker, Loop & Kendrick, LLP; Jeffrey B. Fabian

(57) ABSTRACT

Disclosed are system and methods for digitally capturing, labeling, and analyzing data representing shared experiences between a service provider and a customer. The shared experience data is used to identify, test, and implement value-added improvements, enhancements, and augmentations to the shared experience and to monitor and ensure the quality of customer service. The improvements can be implemented as customer service process modifications, precision learning and targeted coaching for agents rendering customer service, process compliance monitoring, and as knowledge curation for a knowledge bot software application that facilitates automation of tasks and provides a natural language interface for accessing historical knowledge bases and solutions.

19 Claims, 27 Drawing Sheets

Related U.S. Application Data

(60) Provisional application No. 62/867,998, filed on Jun. 28, 2019.

(51) Int. Cl.
*G06N 3/08* (2023.01)
*G06V 20/40* (2022.01)
*G06Q 10/0637* (2023.01)

SYSTEMS AND METHODS FOR DIGITAL ANALYSIS, TEST, AND IMPROVEMENT OF CUSTOMER EXPERIENCE

CROSS REFERENCE TO RELATED APPLICATION

This application claims priority from U.S. nonprovisional application Ser. No. 15/402,210 filed Jan. 9, 2017, the entirety of which is incorporated herein by reference, and to U.S. provisional application No. 62/867,998 filed Jun. 28, 2019, the entirety of which is incorporated herein by reference.

TECHNICAL FIELD AND BACKGROUND

The present invention relates generally to the field of digitally capturing, characterizing, and analyzing data representing an interaction between a customer and a service provider called a "shared experience," and utilizing the captured data to improve the overall customer experience.

Providing customer service often relies on standard processes and scripts to ensure consistency. Such processes must be monitored and maintained to ensure continued compliance by provider representatives as well as to ensure consistency in the quality of service. The processes also must be evaluated and amended from time to time to meet the wide variety and ever changing needs of customers.

Traditional methods for monitoring, maintaining, and amending customer service processes rely on a person listening to and evaluating a limited number of audio recordings from customer interactions. The evaluations can be subjective, and the limited sample size results in a review that is not robust enough to identify the range of possible improvements or to recognize the value of the potential improvements that are identified. Additionally, the evaluations are often reactionary and performed only after problems have arisen and a customer has complained following a negative experience that resulted in significant customer friction. Processes are maintained or amended in part through provider representative training that is also standardized and that requires a significant diversion of provider resources at times when the representatives are needed most to service customers.

Considering the limitations of current methods for monitoring, maintaining, and changing customer service processes, it is an objective of the present invention to provide systems and methods capable of digitizing shared experiences so that the shared experiences can be efficiently, objectively, and electronically characterized and analyzed in real-time. The digital shared experience data is used to ensure compliance with, monitor, and improve, customer support processes and representative performance using scientific, evidence based approaches that rely on "real world" data from actual shared experiences. The shared experience "artifact data" is analyzed to identify opportunities and solutions for process improvements, enhancements, and augmentations where such solutions can be tested and validated through evidence-based techniques that also permit a determination as to the potential value added or return on investment for implementing the solutions. The digitized shared experience data and results of the electronic, real-time process monitoring are also used to design and efficiently deliver personalized training modules to representatives that need it most in a manner that does not disrupt customer service.

SUMMARY OF THE INVENTION

The system provides a computer-implemented method of digitizing and analyzing shared experiences between a customer service provider agent and a customer. In a first embodiment, a provider computing device captures artifact data from a computing device operated by a provider customer service agent. The artifact data can include event data generated by an event source, which can be a hardware device or an event source software application running on the agent computing device as well as written transcript data. The event data is first processed as event data packets received from the event source by a global transaction ingress application programming interface (GTI API). The GTI API performs a transaction analysis that correlates the telemetry data packets into transactions that represent a series of related activities performed by an agent computing device.

The written transcript data may include written communications generated or received by the agent computing device, such as emails or chat messages between an agent and a customer or between agents or other provider representatives. The written transcript data can also include transcribed audio data derived from a recorded conversation between an agent and a customer or between an agent and another provider agent or representative. The captured artifact data is stored to a digital artifacts database as one or more shared experience database records, so that a complete digital record of the shared experience is achieved.

After digitizing the shared experience, the system performs a labeling analysis that creates an ontology describing the shared experience. The labeling analysis associates the shared experience database record (and as a result, the underlying artifact data) with label data representing various label categories, including, but not limited to a Customer Interaction Type identifier, a Customer Intent identifier, a Customer Interaction Segment identifier, a Process identifier, a Task identifier, a Behavior identifier, and a sentiment identifier. The label data that represents the Customer Interaction Segment identifier can take various values that represent the segments of a shared experience, such as an opening segment, an issue description segment, an issue resolution segment, or a closing segment. The label data can be determined using various modeling techniques, including reliance on trained neural networks. In one embodiment, the Customer Interaction segment is determined using a bag-of-words modeling technique.

The system provides a unique Opportunity Explorer graphical user interface that permits an analysis of various aspects of the shared experience over the duration of the shared experience. To achieve this functionality, the Opportunity Explorer interface displays the artifact data underlying the shared experiences as well as the label data as a function of time over the duration of a shared experience. In this manner, the actions performed, processes utilized, sentiment expressed, communications exchanged, and a wide variety of other information can be reviewed over the progression of a shared experience through various segments of the customer interaction.

In another aspect of the system, potential improvements to the shared experience can be tested using the artifact data generated as part of digitizing the shared experience. First a hypothesis is developed that includes a potential improvement or "solution" involving actions to be taken or instructions to be performed by the agent during a shared experience while using the agent computing device. The hypothesis also includes success criteria that is satisfied (or not) by the underlying artifact data generated by the agent computing device when implementing the solution. In other words, the hypothesis is that if an agent uses the agent computing device to implement certain instructions as part of a solution, then a certain result (i.e., success criteria) will be achieved and reflected in the artifact data underlying the digitized shared experience. Thus, as part of the hypothesis testing, the solution and instructions are transmitted to and implemented by an agent computing device. Artifact data is captured from the agent computing device, and hypothesis testing software code analyzes the artifact data in the shared experience database record to determine whether the success criteria was satisfied. When the success criteria is satisfied, the system can also perform a cost/benefit analysis to calculate a return on investment for implementing the solution. In the manner, not only can the success (or not) of the solution be validated, but it can also be quantified to better understand the degree of potential success and potential value of the underlying solution.

In yet another aspect of the system, the solution and accompanying instructions can be sent to an agent computing device when there is availability to perform the testing so as to minimize impact to customer service. Prior to transmitting the solution to the agent computing device, Taskability API software determines the availability of the agent computing device to implement the solution. When the Taskability API determines that the agent computing device is available, the solution is transmitted to the agent computing device as a "MicroTask," or a discrete task to be performed by the agent as opposed to a long-term ongoing series of steps to be taken.

To further digitize and characterize the ontology of a shared experience, the system can capture as part of the artifact data, video data that represents the output of the agent computing device display screen during a shared experience. This allows further insight into what the agent is doing during the shared experience. The video data is gathered as DVR data according to targeted campaigns. The campaigns are directed capturing video data from certain agents, at certain times, or according to various other criteria incorporated into DVR Rules Engine software as scheduling and triggering parameters. The video data is stored to a DVR Database when initiated by DVR Rules Engine software code. The video data is stored along with a tag clip identifier (a unique identifier for the particular shared experience), machine labeling data (e.g., an agent identifier, telephone number, customer identifier, or other useful information relating to the shared experience), and timecode data (i.e., the time progression of the shared experience) before ultimately being stored as artifact data as part of a shared experience database record.

Unlike traditional systems, the present system enables the delivery of training modules to be performed by the agents using the agent computing devices where the training modules are developed using artifact data gathered from actual shared experiences. The system includes a Precision Learning Content Creation Tool that generates the training module using artifact data where the training module also includes instructions to be performed by the agent computing device. The training modules can be delivered to the agent computing devices in a manner that efficiently utilizes agent resources and minimizes the impact to customer service by evaluating agent computing device availability to complete the training modules. The Taskability API determines whether the given agent computing device is available, and the training modules are transmitted to the agent computing device only when the Taskability API determines they are available to complete the training.

In another aspect of the system, the targeted training modules are delivered to agents and agent computing devices based on the results of previous training modules to ensure reinforcement of key concepts and those areas where an agent might have previously struggled. The initial training modules and the targeted training modules are both developed by the Precision Learning Content Creation Tool, and both include artifact data and instructions to be implemented by the agent computing devices. The initial training module is transmitted to and performed by the agent computing device, and training results data generated during performance of the initial training module is evaluated and stored to a database. A Precision Coaching software application selects a targeted training module based on the prior training results data, and the targeted training module is transmitted to the agent computing device.

The digitization of the shared experiences is also useful for augmenting the shared experience through the use of Knowledge Bot software applications that include a natural language interface and artificial intelligence software for accessing a substantial database of prior artifact data and resolutions to prior shared experiences. The Knowledge Bot is utilized during a shared experience, and the system can capture Knowledge Bot or "Kbot" data along with the artifact data and data regarding resolution to a given shared experience. A knowledge curation process evaluates the Kbot data and associates the Kbot data with data relating to the resolution of the shared experience. The Kbot data, relevant artifact data, and shared experience resolution data are stored to a knowledge curation database. That way, the Kbot can be trained to analyze future shared experiences and to access resolutions used in the past to resolve similar issues.

The artifact data generated from digitization of the Shared Experience also enables real-time performance monitoring of shared experience. A compliance monitoring process evaluates the incoming artifact data using compliance rules engine software code that is configured to recognize the presence of at least one trigger condition in the artifact data, such as negative sentiment, customer interaction segments that are running too long, or a wide-variety of other significant occurrences during a shared experience. An alert is generated when the compliance rules engine recognizes a trigger condition in the artifact data stored to a shared experience database record.

The trigger condition can be used to capture additional data or select training modules for delivery to the agent computing device where the training module is targeted to addressing the underlying reason for the trigger condition. The provider computing device analyzes the shared experience database record associated with a trigger condition to determine an end point identifier for a given agent computing device that generated the underlying artifact data. The provider computing device can then capture video data from the given agent computing device and apply a tag clip identifier, machine labeling data, and timecode data before storing this information along with the video data to the digital artifacts database part of the shared experience database record associated with the trigger condition. The video data can be useful for conducting a more detailed evaluation of the shared experience that resulted in the trigger condition to better understand where potential problems or opportunities for improvements exist.

The trigger condition can be addressed in part by using the Precision Learning Content Creation Tool to generate a training module for delivery to the agent computing device. The training module is generated using artifact data from actual shared experiences to ensure usefulness to the agents, and the training module includes instructions to be performed by the agent computing device. The training module can be a targeted training module that is specifically selected for delivery to a given agent computing device by precision coaching software code based on the particular trigger condition. For instance, if the trigger condition resulted from a customer interaction segment taking too long, then a targeted training module directed to improving performance for that segment can be delivered to the agent computing device from which the artifact data was captured.

In yet another embodiment, the digitization of shared experiences also enables the monitoring of agent performance. Particular aspects of the artifact data are selected as performance metrics, such as the number of support requests handled by an agent in a given time frame, sales data, or data regarding expedient and timely handling of customer interaction segments. The shared experience database records and underlying artifact data are evaluated to identify the performance metrics and the identity of the agent associated with a given agent computing device from which the underlying artifact data was captured. The performance metrics can be displayed with the agent identity on a performance dashboard graphical user interface. Similar to the compliance monitoring process, the Precision Learning Content Creation Tool can utilize artifact data to generate targeted training modules directed to improving agent performance, and precision coaching software code analyzes the performance metrics to select the appropriate targeted training module for delivery to the agent computing device.

BRIEF DESCRIPTION OF THE DRAWINGS

Features, aspects, and advantages of the present invention are better understood when the following detailed description of the invention is read with reference to the accompanying figures described as follows.

FIG. 10 is an example Investigate Opportunity graphical user interface that permits a detailed review and analysis of underlying Artifact Data.

FIG. 16 is an example graphical user interface for creating a hypothesis to be tested relating to shared experience improvement opportunities.

FIG. 17 is an example graphical user interface for designing an experiment relating to shared experience improvement opportunities.

FIG. 18 is an example graphical user interface for reviewing historical and current experiments.

FIG. 27 is an example graphical user interface for entering information relating to Knowledge Bot performance.

DETAILED DESCRIPTION

Figure 1:
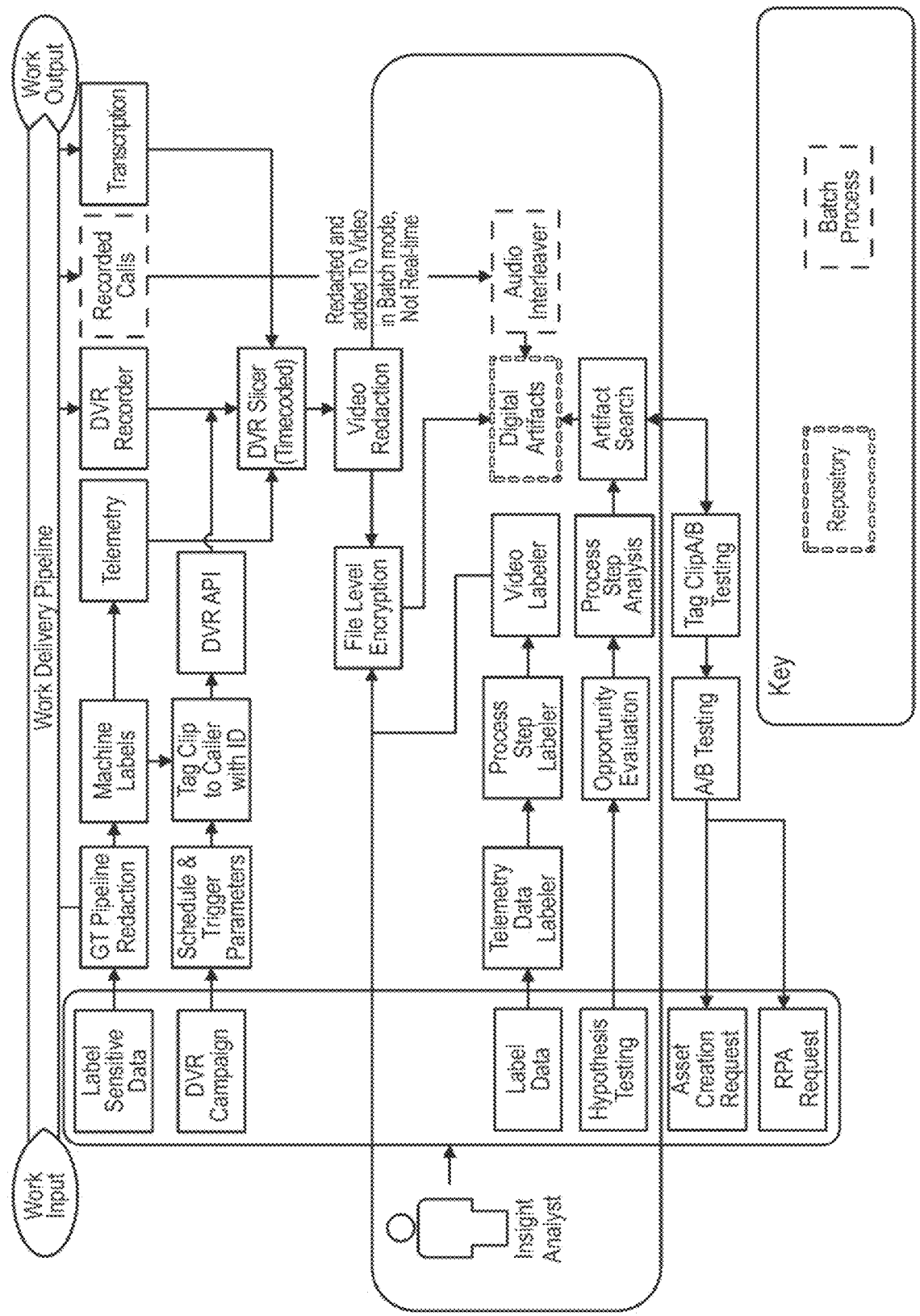
FIG. 1 is an example process flow diagram for a Digital Insight system according to one embodiment.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole as would be appreciated by one of ordinary skill in the art. The nomenclature utilized to designate various devices and software applications is not intended to be limiting, and reference to a device or application with a particular commercial, proprietary, or other name can be construed to encompass other devices and applications that perform a similar function or have a similar structure.

As used herein, the term provider generally describes the person or entity providing services, such as customer support. The term "customer support" is used interchangeably with the terms support, customer service, customer interaction, or "shared experience" and generally includes, but is not limited to, providing customers with assistance in utilizing existing products and services and with purchasing additional products and services. The term "client" is used to generally denote a separate business entity from the service provider. Customers of the client are provided support by the service provider on behalf of the client; in other words, the provider is operating as a third-party provider of customer support services for the client. The term "agent" generally describes an individual who interfaces with the customer to provide customer support using the systems and methods described herein, and the term is used interchangeably with the terms end user, user, associate, or representative.

Disclosed is a Digital Insights system and methods for digitally capturing, labeling, analyzing, and utilizing data representing "shared experiences" between a provider and a customer to identify, test, and implement value-added improvements, enhancements, and augmentations to the shared experience and to monitor and ensure the quality of customer service. The opportunities for improvements, enhancements, and augmentations can be implemented as a variety of potential solutions, such as process modifications, precision learning and targeted coaching for agents rendering customer support, process compliance monitoring, or improvements to an automated Knowledge Bot software application that provides automation capabilities and a natural language interface for accessing substantial historical knowledge bases and solutions.

The embodiments discussed in this disclosure are described with reference to improving customer service interactions that take place in a call-center environment between a provider's customer service agent and a customer. However, those of ordinary skill in the art will appreciate that the disclosed systems and methods are applicable to improving customer experiences generally whether the experiences occur in-person, through an instant chat message exchange, email, video conferencing, or the like, and whether the shared experience involves interaction with a provider technical support agent, sales agent, team lead, manager, contractor, or other provider representative.

An example process flow illustrating operation of a Digital Insights system is depicted in FIG. 1. An advantage of the current Digital Insights system is that it is integrated with the provider's production system, labeled Work Delivery Pipeline in FIG. 1, so that the Digital Insights system can capture, analyze, and utilize actual "real-world" production data in connection with testing, designing, and creating process improvements, enhancements, and augmentations.

As depicted in FIG. 1, the system gathers Artifact Data from the Work Delivery Pipeline production system that includes, but is not limited to, event data gathered at the GT Pipeline Redaction step in FIG. 1, video data at the DVR Recorder step in FIG. 1, audio data at the Recorded Calls step, and written communication data at the Transcription steps that captures data such as audio transcripts of calls, emails, and real-time messaging (i.e., "chat messaging"), and any other useful Artifact Data representing a shared experience between a provider and a customer. The DVR application programmable interface ("API") process can be configured to capture and store Artifact Data through a DVR Campaign that uses Schedule & Trigger Parameters to capture video data according to predetermined criteria. The video data captured by the DVR API is appended with time data relating to the time line or duration of the shared experience at the DVR Slicer step, and the video data is redacted and encrypted at the Video Redactions and File Level Encryption steps.

After being captured, a labeling or ontology analysis is used to label Artifact Data through a combination of human labeling using a graphical user interface ("GUI") at the Label Data, Telemetry Data Labeler, Process Step Labeler, and Video Labeler steps shown in FIG. 1. The Digital Insights system can also utilize automated machine labeling at the Machine Labels and Tag Clip to Caller with ID steps that utilizes software application to perform the labeling or ontology analysis. The labeling or ontology analysis creates a shared experience ontology that is a set of concepts defining the shared experience and the relationship between the provider and the customer in that interaction. The Digital Insights system permits Artifact Data to be gathered and labeled in part by the provider agents, who are subject matter experts in the particular type of shared experience, with minimal interruption to customer service.

The labeled shared experience Artifact Data is analyzed using an Opportunity Explorer Process at the Opportunity Evaluator and Process Step Analysis steps of FIG. 1 to identify potential opportunities for augmentation, optimization, and improvement to client and provider processes and the overall shared experience. A hypothesis is developed centered on a whether a process modification or action (i.e., a "solution") will successfully realize the potential improvement opportunity identified by the Opportunity Explorer process. After existing Artifact Data is searched for historical information relevant to the hypothesis at the Artifact Search step, the hypothesis or potential solutions are tested through a Hypothesis Testing process that facilitates the design and implementation of an experiment directed to testing the hypothesis. The experiment is conducted using AB testing, for example, which gathers Artifact Data from shared experiences that implement the proposed process change to yield evidence-based experimental results.

The Hypothesis Testing process yields evidenced-based results that provide insight into whether the hypothesis proved to be true, thereby validating (or not) the underlying proposed solution. The Digital Insight system further permits the calculation of the potential cost, value added, and return on investment for implementing the proposed solution. Thus, the Digital Insights system not only permits the identification and reliable evidence-based testing of potential opportunities for improvements, optimization, and augmentation, but the system also facilitates valuation and comparison of multiple solutions for the same improvement opportunity.

The Digital Insights system also implements a Precision Learning Process that delivers just-in-time, targeted and personalized training to agents or other provider personnel. A Precision Learning Content Creation Tool software application utilizes Artifact Data from effective and cautionary examples of shared interactions to create question-based, simulation, or other types of training modules. A Precision Coaching Process facilitates delivery of targeted, personalized training to provider personnel by identifying personnel that could benefit most from, or that require, particular types of training modules that are created from "real-world" Artifact Data from actual shared experiences. A Taskability API determines personnel availability to complete training modules in a manner that minimizes or eliminates disruption to customer service and delivers the training modules to agents or other provider personnel as MicroTasks.

The Precision Learning Process also relies on a Spaced Learning Process and a Precision Coaching Process to deliver supplemental training modules at periodic intervals and/or based on the particularized needs of personnel that, for instances, did not perform well on prior training modules. In this manner, prior precision learning can be reinforced in a targeted and personalized manner. The Spaced Learning Process and Precision Coaching Process can likewise utilize a Taskability API to deliver supplemental training modules as MicroTasks in a manner that minimizes or eliminates disruption to customer service. The Precision Coaching Process can utilize a Performance Monitoring Process that monitors personnel performance to deliver training modules specifically directed to addressing performance needs of particular personnel. A Compliance Monitoring Process implements a rule engine that detects and records Artifact Data for shared experiences that deviate from a specified customer service process so that the deviations can be addressed with targeted training modules.

The shared experience Artifact Data can be used in conjunction with provider personnel feedback to curate and train a software implemented Knowledge Bot ("Kbot") that can be designed to assist provider personnel and customers by automating certain tasks and providing a natural language interface to substantial knowledge bases and solutions. Provider personnel input information concerning Kbot performance that is analyzed along with Artifact Data and other data captured by the Kbot to create a knowledge base from which the Kbot can draw to improve the Kbot's ability to accurately find and deliver solutions.

Figure 2:
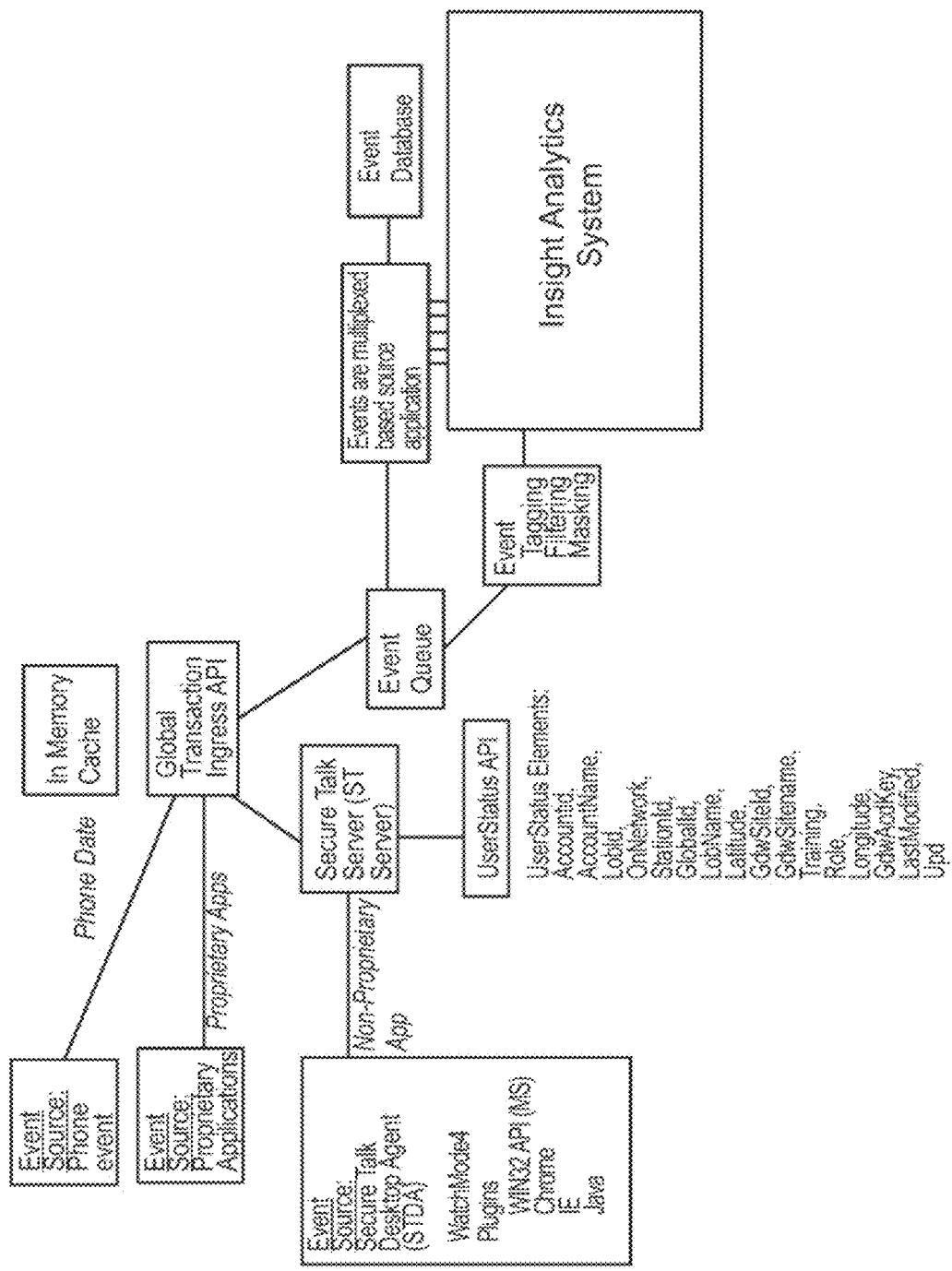
FIG. 2 is an exemplary system diagram according to one embodiment that illustrates gathering event data from multiple sources and organizing the event data into transactions.
Figure 3:
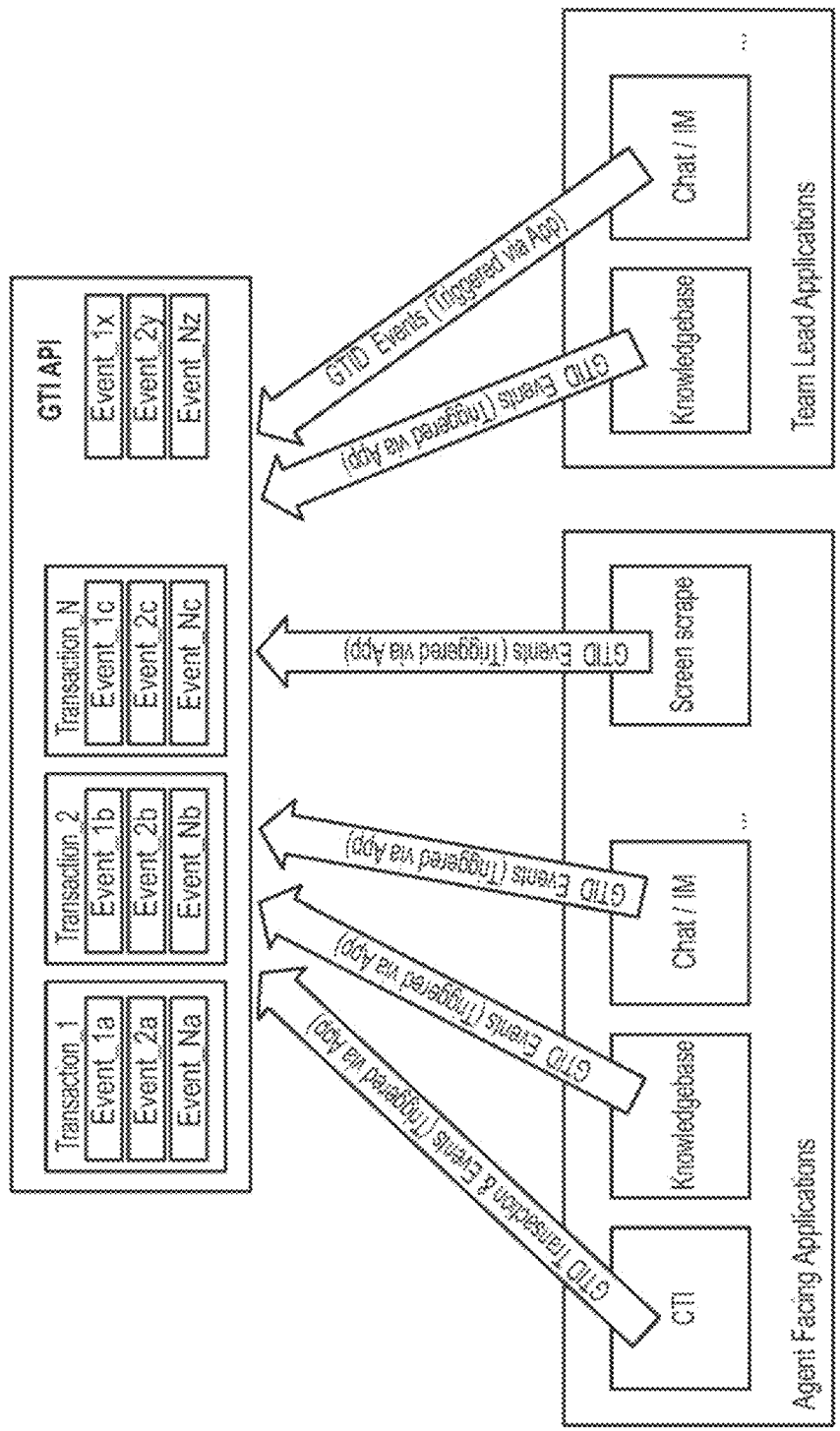
FIG. 3 illustrates an exemplary process for correlating received event data into transactions.

One advantage the Digital Insight system provides over existing systems is the robust ability to gather a wide variety of Artifact Data representing the shared experience, including video data, audio data, written transcript data of customer communications, and event and telemetry data. Event and other types of Artifact Data are gathered in real-time during shared experiences. An example system configuration for gathering Artifact Data according to one possible embodiment of the system is depicted in FIG. 2 and includes: (i) multiple categories of event sources; (ii) a global transaction ingress application programmable interface ("GTI API") running on a first server; (iii) a Secure Talk application running on a second server ("ST Server"); (iv) a User Status API; (v) a Memory Cache; (vi) an Event Queue; and (vii) an Event Database. The system embodiment shown in FIG. 1 is not intended to be limiting, and one of ordinary skill in the art will recognize that the systems and methods of the present invention may be implemented using other suitable hardware or software configurations. For example, the system may utilize only a single server implemented by one or more physical or virtual computing devices, or a single computing device may implement one or more of the GTI API, the ST Server, or the event sources. Further, a single computing device may implement more than one step of the method described herein; a single step may be implemented by more than one computing device; or any other logical division of steps may be used.

The various system components are generally implemented by software applications running on one or more physical or virtual computing devices (e.g., a virtual desktop application). To illustrate, in one embodiment, the various event sources are implemented by software applications that run on a physical agent computing device in communication with the GTI API running on a separate server computing device. Alternatively, the event sources can be implemented as software applications running on a virtual computing device that is in turn running on the same physical computing device as the GTI API. The computing devices may also utilize software applications that function using resources available through a third-party provider, such as a Software as a Service ("SasS"), Platform as a Service ("PaaS"), or Infrastructure as a Service ("IaaS") provider running on a third-party cloud service computing device. For example, a cloud computing device may function as a resource provider by providing remote data storage capabilities that implement the Event Database or Event Hubs shown in FIG. 1.

Gathering Artifact Data

Artifact Data includes a wide variety of data and information that represents a shared experience interaction between a provider and a customer of a product or service. Artifact Data can include, but is not limited to: (i) video recording data of a customer interaction, such as a recording of an agent's computing device display screen or desktop captured and stored during a customer interaction that provides insight into what tasks and functions the agent was performing during the customer interaction; (ii) audio data of dialog between a customer and an agent, including a recording of a customer call; (iii) written transcript data of communications between an agent and a customer, including a transcript of audio data representing spoken discussions, email exchanges, or instant chat messages; (iv) user data entered by an agent during a shared experience; and (v) event data gathered from various event sources, such as an agent's telephone device or computing device. In some cases, event data can include video data, audio data, written transcript data, or user data when, for example, an email sent by an agent is captured from an email software application event source or user data entered by an agent is captured from a database software application event source utilized by an agent.

The telemetry data is a type of event data that represents actions performed by an agent or by an agent's physical or virtual computing device or "desktop." Event data generally includes telemetry data generated by the agent's computing device as well as data generated by other event sources. Event sources can be hardware components (e.g., a desktop computer or telephone) or software applications (e.g., Internet browser or a background operating system process) that are utilized during a shared experience. The event data can include written transcript data such as emails and chat communications with a customer or other agents generated using an email or chat software application event source. Even data can also include audio data captured by a physical or virtual telephone or audio data captured by another software application, such as a remote virtual meeting software application. The audio data can also be converted to written transcript data for further processing.

Event data can include data generated by event sources that are separate from an agent's computing device or separate from an agent's desktop, such as communications from other provider personnel, communications or other data from Chat Bots or Knowledge Bots, or data generated when an agent participates in training in a different desktop environment than the environment utilized by an agent during a shared experience. The event data is captured synchronously (e.g., at periodic intervals) and asynchronously as events or actions occur (e.g., when an agent performs an action).

The event data can further include state information relating to the agent computing device or an event source software application running on the agent computing device. For instance, answer call event data received from a virtual telephone software application indicates an On Call state, and receipt an end call event indicates an Off Call state. State information can also be obtained from other event sources, such as an After Call Wrap-up ("ACW") application where an agent may be required to perform additional processing following the end of a call, such as data entry related to the call, which indicates the agent computing device is in an Off Call state. In this example, the event data can further include user data entered by the agent into the ACW application, such as information relating to the outcome of the shared experience (e.g., was a sale achieved and at what dollar value or was the customer's technical support issue resolved).

The event sources transmit the event data to a GTI API either directly or through a ST Server. The GTI API correlates and associates related events into transactions that represent one or more activities or actions performed to accomplish a given task. In this manner, the system gathers data relating to individual actions performed by an agent or agent device and provides insight into how the agent devices are utilized to accomplish a given task or transaction over time as part of a shared experience between a provider agent and a customer. A description of the processes and devices used in capturing event data and organizing the data into transactions is also found in Applicant's pending patent application Ser. No. 16/170,504 the entirety of which is incorporated herein by reference.

The system can accommodate multiple types of event sources in various configurations. As an example, the phone event source shown in FIG. 1 can be implemented as a separate hardware telephone device connected to computer telephony interface ("CTI") system or as a virtual telephony interface ("VTI") that runs as a software application on a physical or virtual end user computing device. Multiple software applications serving as event sources can run on a single agent computing device. The system will generally include a plurality of agent computing devices where each agent computing device implements multiple event sources.

The event sources capture event data that represents various activities occurring at the agent computing device as well as other useful information. The system can utilize any suitable number and type of event sources that are configured to capture event data and transmit the event data to the GTI API either directly or through the ST Server in an event data packet format. The event data can be transmitted using JavaScript Object Notation ("JSON") or any other suitable format. The event data packets are transmitted to the GTI API asynchronously as each event occurs to ensure real-time capture of relevant event data.

The available data fields and content for the event data packets are customizable and will generally vary depending on, among other things, the event source software application. Exemplary event data fields include, but are not limited to: (i) time and date data; (ii) an event identifier that can be used to determine the activity represented by the event data (e.g., answering the phone, placing a call on hold, typing or sending a message, performing an Internet or database search); (iii) an event type indicating the category of activities represented by the event (e.g., a phone event, a training event, etc.); (iv) one or more flags indicating whether the event is a start event, end event, or neither; (v) an endpoint identifier, such as an event source identifier that identifies the software application originating corresponding event data; (vi) an endpoint identifier such as an event source User Principle Name ("UPN") used by the event source to identify the current end user of the event source application or the agent computing device, which can be, for instance, a username, employee number, or other identifier entered by the end user when logging into the agent computing device or into the software application that serves as the event source; (vii) an endpoint identifier such as Device Identifier that identifies the particular computing device used by an agent, which can be a hardware serial number, a network identification number, or any other identifier unique to the agent computing device; (viii) a global user identifier ("GUID") that identifies the end user of the agent computing device and that is independent of the software applications or computing devices being utilized; (ix) a source record identifier that identifies a unique record in the event source application and that can be utilized to lookup additional information in the source application's database about the event; (x) a global transaction identifier ("GTID") useful for associating related events into transactions as part of a transaction analysis performed by the GTI API; (xi) a client account identifier and a line of business identifier that can be used by a service provider to identify a client or industry being served by the activities of end user and agent computing device; and (xii) any other information available from the event source that is useful for characterizing and analyzing a shared experience between a provider and a customer.

As shown in FIG. 1, the phone event data is captured and transmitted directly to the GTI API in real time. The phone event source can capture event data such as, a start call event, an end call event, or an on-hold event indicating that an ongoing telephone call has been placed on or taken off hold.

Event sources can include various proprietary and non-proprietary software applications running on the agent computing devices. Non-proprietary or commercial software applications running on the agent computing devices can include, for instance, the computing device operating system software (e.g., Microsoft Windows®), Java® virtual machine, or Internet browser applications (e.g., Google Chrome® or Internet Explorer®). The proprietary and non-proprietary software applications capture event data such as text entered in a graphical user interface, the selection of an input function that initiates a keyword search in an Internet browser, or sending a communication through an instant chat message software application.

Proprietary software applications can be designed and preconfigured to asynchronously capture event data in real time for transmission directly to the GTI API. Non-proprietary applications, however, might not be configured to permit the asynchronous capture and transmission of event data. The system shown in FIG. 1 illustrates the use of a Secure Talk Desktop Agent ("STDA") software application running on the agent computing device to interface with various non-proprietary applications (e.g., the Win32 API for Windows®) to enable the capture and transmission of event data. The STDA application may establish a protocol for reading the particular output of the non-proprietary software application and translating the output into a JSON packet for transmission to the GTI API. Alternatively, where a protocol for reading the output of a non-proprietary software application cannot be established, the STDA may utilize techniques such as "screen scraping" that captures human-readable outputs from the non-proprietary application intended for display on a monitor.

The STDA or other event sources may transmit the captured event data to the GTI API directly or through the ST Server, as illustrated in FIG. 1. Event data processing functions, such as data enrichment, can be performed in whole or in part by the intermediary ST Server or another computing device running a User Status API. Other embodiments may utilize multiple GTI APIs to handle incoming event data.

The event data is enriched by appending one or more user status elements to the event data. The ST Server queries a User Status API using the UPN, and the User Status API returns information relating to the end user that is then appended to the event data as user status elements before transmission to the GTI API. In some embodiments, the GTI API can perform the data enrichment function. Or alternatively, the data enrichment can be performed by the event source software application itself prior to transmission to the GTI API or the ST Server, as illustrated in FIG. 1 where the proprietary applications event source is preconfigured to generate site, account program, and line of business ("SAPL") data that is sent with the event source data to the GTI API. The generated SAPL data can also be utilized to properly direct transmission of the event data to a particular GTI API in embodiments where multiple GTI APIs are utilized. So, for example, all event data coming from particular provider sites can be directed to a dedicated GTI API for those sites.

In the context of a call center where the end users are provider agents fielding consumer calls regarding various products or services provided by various clients, the user status element data can include: (i) a client account name and identification number for the client; (ii) a line of business identifier for the call service provider (i.e., a given industry or category of products); (iii) an agent computing device identifier; (iv) an agent role designation (i.e., junior agent, senior agent, supervisor, etc.); (v) geographic location data for the provider agent; (vi) a site identifier if the provider agent is working from a given provider location or office; (vii) an "on-network" flag indicating whether the provider agent is working remotely or from within a provider location; or (viii) or any other information useful for characterizing a customer-provider interaction.

Following enrichment and receipt of event data, the GTI API performs a transaction analysis that correlates the event data packets into transactions that represent a series of related activities performed by the agent computing device to accomplish a particular task. Following the transaction analysis, the event data packets that have been correlated into transactions are stored to an Event Queue. The correlation of event data into transactions is depicted in FIG. 2 where various event source software applications (e.g., CTI, Knowledgebase, Chat/Instant Message) transmit event data, or "GTID Transaction & Events," to the GTI API. The GTI API then correlates the events into separately identified transactions (i.e., Transaction_1, Transaction_2, ... Transaction_N).

To facilitate the correlation, certain events can be designated by the event sources as start events or end events signaling the beginning or end of a transaction. In a call center, for example, many transactions will focus on the receipt and handling of customer phone calls. Thus, answering the phone can be designated as a start event and hanging up the phone can be designated as an end event. On receiving event data from an event source, the GTI API determines both the UPN and whether the event data represents a start event or end event. The event can also be designated as an intermediate event within a transaction.

The lack of a start event or end event designation in the incoming event data can be interpreted as the event data being an intermediate event in which case the GTI API associates the intermediate event with an open transaction having a matching transaction identifier. If no open transaction identifier exists for an intermediate event, the GTI API assigns a new transaction identifier and interprets the intermediate event data packet as being a transaction consisting of a single event.

The transactional analysis correlates the event data into transactions by, for example, determining whether each packet represents a start event that constitutes a new transaction, an intermediate event relating to an open transaction, or an end event relating to an open transaction. The GTI API determines whether an open transaction exists by searching the Memory Cache for a transaction identifier that matches the transaction identifier in a received event data packet. If an open transaction exists, then received event data is associated with the transaction identifier for the open transaction by appending the transaction identifier to the event data in a relational database. If no open transaction exists, then a new transaction identifier is assigned to the event data and associated with the event data in a relational database.

Turning again to FIG. 1, the GTI API utilizes the UPN to query the Memory Cache, which can be implemented as a database that includes a table of open global transaction identifiers ("GTID") and the associated UPN. Upon receipt of a start event, the GTI API assigns a GTID to the start event and stores it to the Memory Cache with the associated UPN. This permits the GTI API to determine whether there is an open transaction for received event data, such as when a start event was received with a given UPN but no end event has yet been received with the same UPN.

Event data packets that have been correlated into transactions by the GTI API are stored to the Event Queue as telemetry data associated with a GTID. The event data is optionally subjected to additional processing while stored to the Event Queue, such filtering, masking, or labeling (described below). The event data masking process scrubs the event data to remove certain information according to predetermined and customizable preferences, such as removing social security numbers, financial account numbers, or other sensitive data. The event data can also be filtered to delete particular events according to predetermined and customizable preferences. Event data stored to the Event Queue is multiplexed to group the event data according to the event source application before being stored to the Event Database for longer term storage or passed to an Insight Analytics process software application.

Video and audio data of shared experiences is captured continuously and stored to a Digital Video Recording ("DVR") storage device according to predetermined campaign parameters. For instance, certain customer interactions can be captured and stored to DVR for regulatory compliance purposes, or digital and audio data can be gathered for customer interactions involving an agent that is known to be exceptionally efficient or who is known to deviate from client-required processes.

Figure 4:
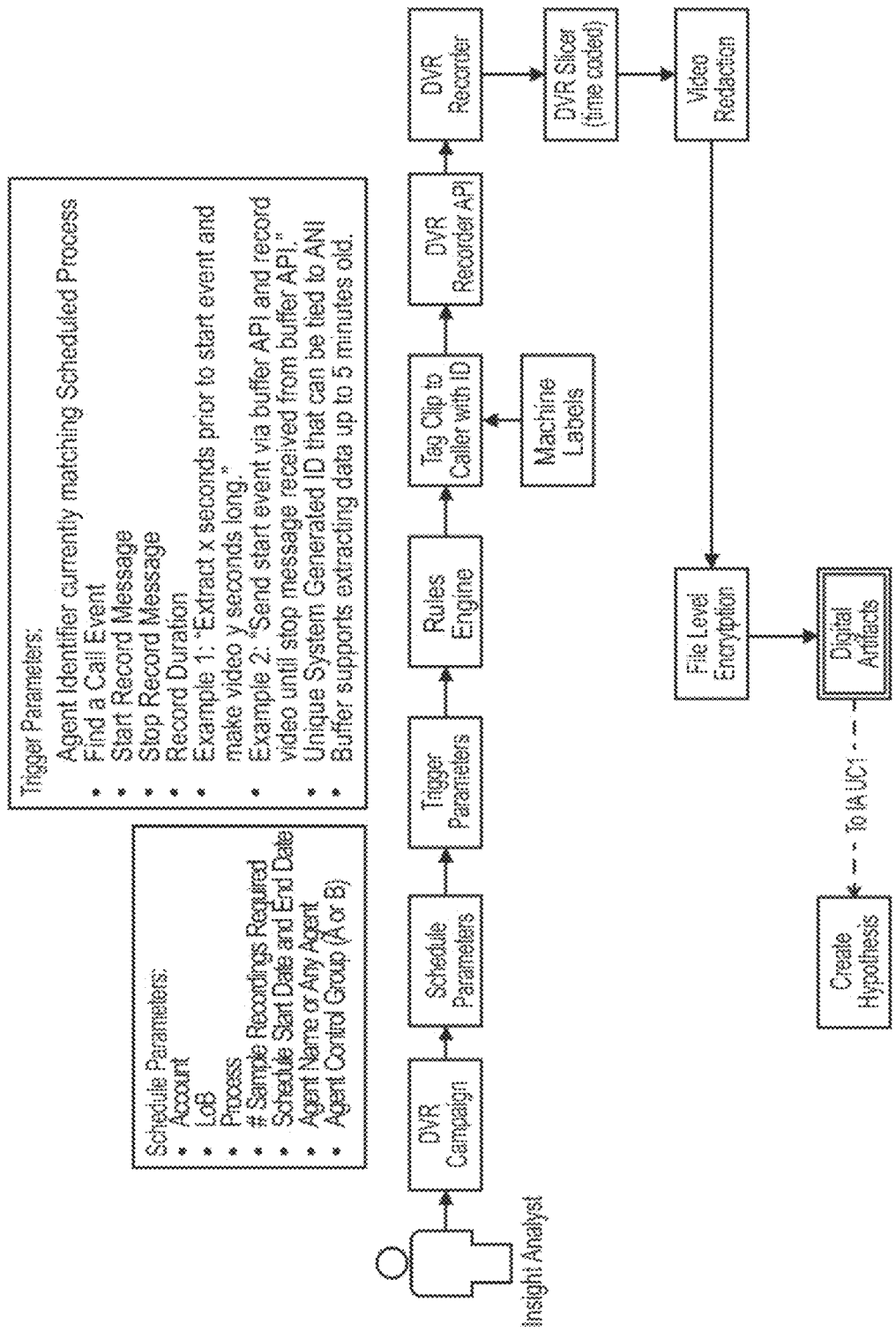
FIG. 4 is an example process flow diagram for implementing a Digital Video Recorder Campaign to gather Artifact Data.

An example process for implementing a DVR campaign is depicted in FIG. 4. The system depicted in FIG. 4 continuously captures and saves video data from agent display screens to a temporary storage buffer managed by the DVR Recorder API. The captured video data is then moved to a permanent database storage shown as the DVR Recorder in FIG. 4 according to predetermined scheduling and trigger parameters established by a provider user denoted as an Insight Analyst. The process begins at the Schedule Parameters step where criteria are established concerning the type of shared experiences that will be stored for analysis. Audio data from the shared experiences can be captured in a similar fashion in which the audio data is saved to a buffer before being moved to permanent database storage according to campaign scheduling and trigger parameters.

The DVR and/or audio data campaign can accommodate a wide variety of possible scheduling parameters, such as storing video data according to certain provider clients, lines of business, or for certain client-required processes. To illustrate, if a client requires agents to utilize a specific trouble shooting process for customer technical support requests relating to a specific product, then a DVR campaign can be established that stores shared experiences involving technical service requests for that particular customer and product. DVR campaign scheduling parameters may additionally be established to store video data for certain named agents or for all agents with specific experience parameters, such as all agents with less than a year of experience. The scheduling parameters are also useful for setting limitations on the sample size of the recorded video data, such as specifying a set number of shared experiences to be stored over a specific data range.

The process continues with the Trigger Parameters step to establish criteria surrounding when capture and storage of shared experience video data is initiated and the parameters of the capture and storage operations. The trigger parameters can include, for example, initiating storage of video data upon receipt of a start event associated with a particular GUID and ending the storage of video data upon receipt of an end event with the same GUID. The trigger parameters can also include specifying the duration of the video data storage, such as storing data for thirty seconds prior to the receipt of a start event and for thirty seconds after the receipt of an end event.

At the Rules Engine step, the scheduling parameters and trigger parameters are stored to a cloud-based rules engine that monitors the event data and other Artifact Data relating to the agent computing and other devices and transmits the start or stop recording messages when shared experiences are identified that meet the DVR Campaign specifications. Once the video data is recorded, a tag clip identifier and/or machine labels are appended to the video data or associated with the video data in a relational database. A tag clip can be a unique alpha numeric identifier for the shared experience, and the machine labels include relevant telemetry data or other Artifact Data, such as client data, or customer information associated with the video data, such as a customer or agent telephone number, an agent GUID, or time and date data.

The DVR Recorder API stores the video data associated with a tag clip and machine labels to the DVR Recorder database for long term storage and further analysis. After the video data is stored to a permanent database, the DVR Slicer application applies time codes to the video data to facilitate review of the video data in a video playback software application according to time frames (i.e., minutes and seconds). The Video Redaction application permits redaction of sensitive information from the video data, such as customer credit card numbers or identifying information. The video data is then encrypted before being made available for the Insight Analytics labeling process as part of creating the shared experience ontology.

Insight Analytics Labeling and Ontology Analysis

Once the digital Artifact Data is gathered, the labeling or ontology analysis is utilized to examine the shared experiences underlying the Artifact Data to create an ontology that is a set of concepts defining the shared experiences. As the ontology is defined, it is used to train machine learning models so that a software process can be used to perform future labeling analyses that classify shared experiences and make recommendations about those interactions between customers and a customer service provider. The labeling analysis relies on a combination of machine and human-performed Artifact Data labeling.

Figure 5:
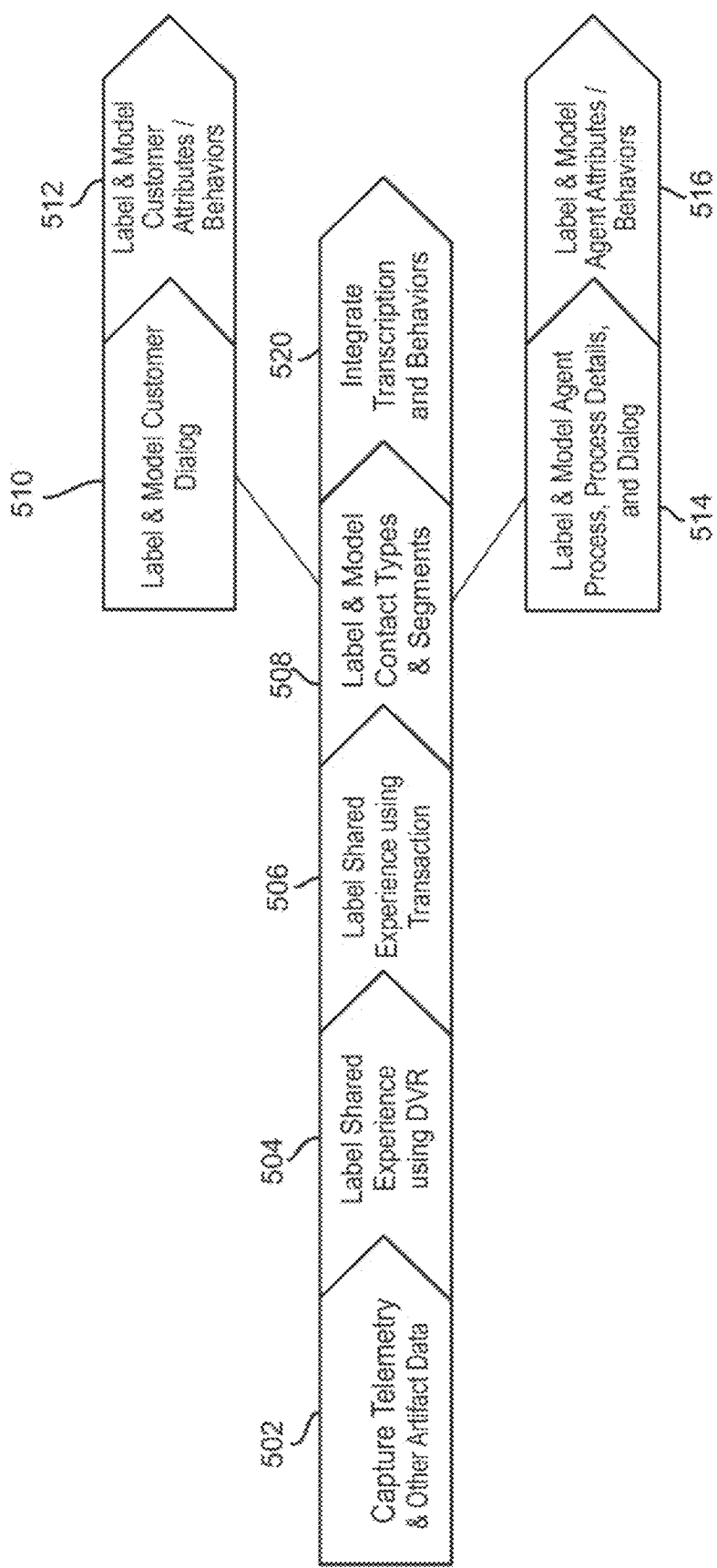
FIG. 5 is an example process flow for labeling Artifact Data.

A simplified example of an Insight Analytics process flow for performing a labeling analysis is shown in FIG. 5. The example process begins with capturing Artifact Data 502 followed by labeling video data 504 using the display interface shown in FIG. 6. After labeling the video data, the process labels the written communication or transcript data 506, including transcripts of audio recordings for the underlying shared experiences generated by a physical or virtual telephone or virtual meeting software, as well as emails or chat messages. As labeling of the video data and written communication or transcript data progresses, the labeling process utilizes machine learning techniques to train models for recognizing Customer Interaction Types and Customer Interaction Segments 508. The models are used to algorithmically label future shared experiences.

Sublabels are applied, as illustrated by the upper and lower branched segments in FIG. 5, where the agent dialog and behavior 510 & 512 is labeled separately from the customer dialog and behavior 514 & 516. The labeled Artifact Data can also be integrated 520 so that labeled Customer Interaction Segments, Behaviors, Sentiments, or other labeled categories are associated with corresponding portions of the video data or written transcript data.

The Artifact Data can be labeled according to any number of relevant categories. Examples of relevant label categories in the context of a customer service provider in a call center environment include, but not limited to: (i) Customer Interaction Type—the reason for the customer interaction, such as calling to register a product, purchase or return a product, get technical support for a product, or lodge a complaint about a product or service; (ii) Customer Intent—the outcome a customer was hoping to achieve, such as calling to return a product, request a refund, request technical support, or purchase a product or service; and (iii) Customer Interaction Segment—one of four critical parts of a customer interaction, including (1) the Opening where an agent and the client are introduced and the customer is asked how the agent can assist, (2) the Issue Description where the customer explains the reason for the customer interaction, (3) Issue Resolution where an agent works to resolve the issue underlying the reason for the interaction, and (4) the Closing where an agent thanks the customer for contacting the client or provider.

Additional examples of label categories relevant to the provision of customer service can include: (iv) a Process category that relates to client-specified processes for accomplishing certain activities, such as verifying a customer's identity, troubleshooting a technical issue with a product, issuing a return or refund, or performing sales activities; (v) a Task category that describes tasks performed by an agent during the various processes, such as looking up a customer's information in a Customer Relationship Management ("CRM") database as part of the identity verification process, searching a product manual during a technical support call or sales call, or updating customer contact or payment information in a CRM database; (vi) a Behavior category that describes the demeanor exhibited by the customer and the agent at given points in time during a shared experience, such as active listening, typing, providing spoken feedback, expressing frustration by a customer during a verification process, or demonstrating confidence exhibited by an agent during Issue Resolution; and (vii) a Sentiment category that describes the emotion exhibited by an agent or customer during an interaction, such as agitation with a trouble shooting process that is taking unusually long or satisfaction with an issue that was expediently resolved.

The labeling analysis can rely on human-labeling, automated labeling, or a combination of such techniques. For instance, a person may listen to an audio recording or review a transcript of a customer interaction and determine approximate time frames for the Opening, Issue Description, Issues Resolution, and Closing segments while a software algorithm may be applied to the audio data and/or the accompanying written transcript data to determine Behavior and Sentiment descriptions.

Figure 6:
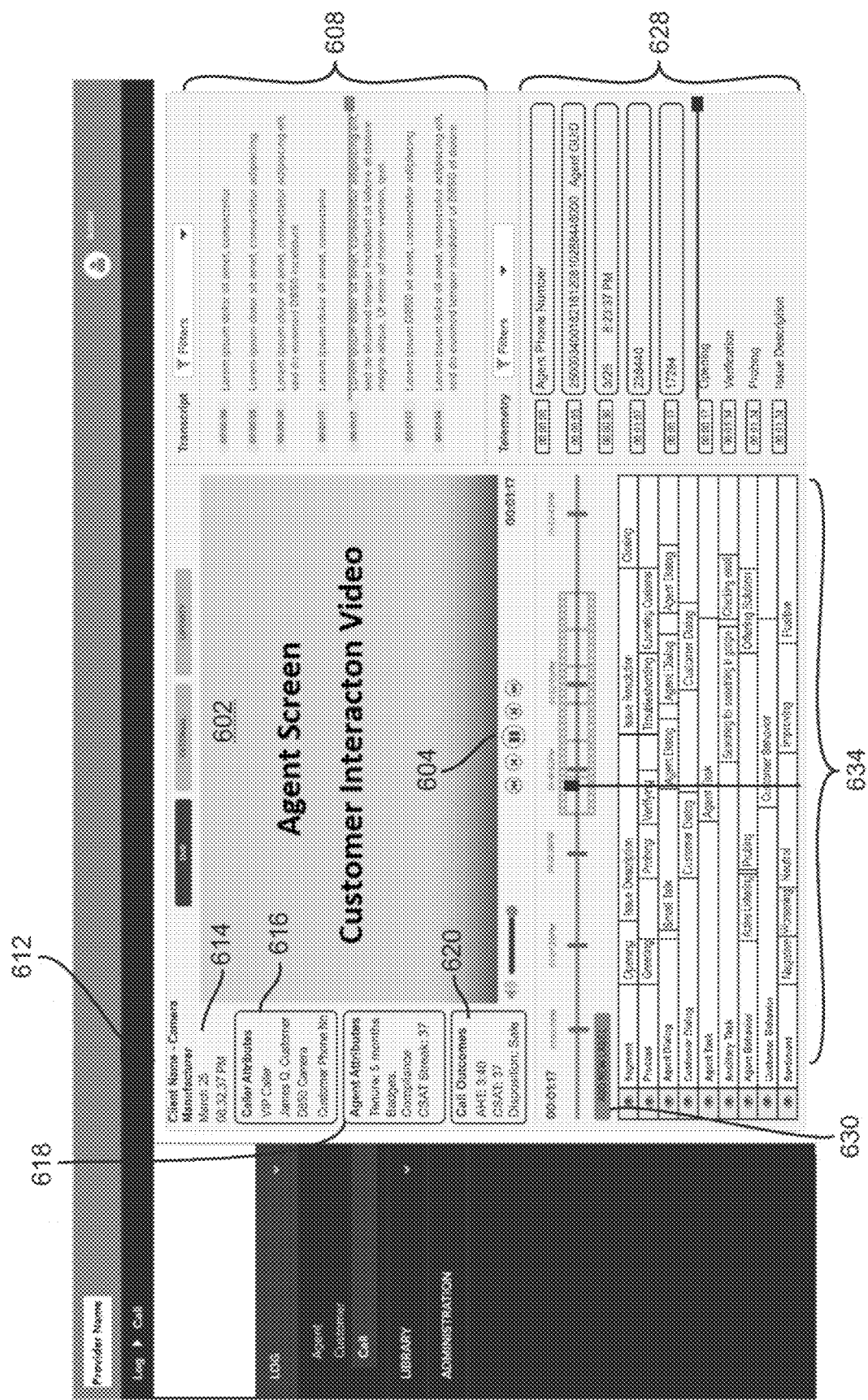
FIG. 6 shows an example graphical user interface for labeling Artifact Data.

The Artifact Data labeling analysis process can be better understood with reference to the exemplary labeling interface display shown in FIG. 6. The labeling interface graphically displays various components of the Artifact Data representing a shared experience and includes functions that provide tools for reviewing and labeling the shared experience. The labeling interface includes a panel with control functions 604 for playing a video of an agent's screen 602 captured during a shared experience. The video playback provides a visual log of the Tasks performed by an agent during a shared experience. The labeling display interface further includes control functions for replaying an audio recording of the agent's phone call with a customer as well as functions for reviewing a transcript 608 of the audio or any written communications between the agent and customer.

The labeling display interface can include frames that display information relating to the client 612, the shared experience 614, the customer 616, and the agent 618 gathered from the captured telemetry data. For instance, the labeling interface in FIG. 6 displays the client name, the product at issue in the shared experience that was manufactured or sold by the client, the date and time of the shared experience, the customer name, the status of the customer (e.g., a "VIP" customer, new customer, etc.), the agent name, the agent's tenure with the service provider, the duration of the shared experience, and the outcome 620 of the shared experience. The labeling interface also includes machine applied labels and telemetry data 628, such as the agent telephone number, agent GUID, or call Segments.

Labels are applied to the Artifact Data by selecting the Add New Label function 630. As the video or audio data is reviewed, labels 634 are applied to identify the Customer Interaction Segments, Customer Process, Tasks, Behavior, and Sentiment, among other labels. For instance, the first two minutes of a shared experience might be labeled as the Opening segment using a client-specified Greeting Process to gather and provide information from a customer. The Sentiment for the Opening segment might be labeled as "negative" if the customer is expressing frustration over a given technical support issue. The next two minutes of the customer interaction might be labeled as the Issue Description segment and as using a client-required Verification Process to gather information from the customer and verify the customer's identity. The agent's Behavior during the Issue Description segment might be labeled as "actively listening" or "asking questions" while the agent Tasks might be labeled as "performing a database search" or "reviewing product guidelines" as the agent is gathering information to assist the customer.

The labeling analysis process permits the use of sublabels to further categorize the shared experience. For instance, Sentiment might be broken down into both Customer Sentiment and Agent Sentiment subcategories. The Customer Sentiment might be further sublabeled according to Customer Sentiment towards the agent or Customer Sentiment towards the issue faced by a customer. Those of ordinary skill in the art will appreciate that the above examples are not intended to be limiting and any suitable number and type of label and sublabel categories can be applied to a customer interaction to develop an ontology that meets the needs of a particular provider or client.

The Artifact Data labeling can be performed in part by customer service agents, who by virtue of their experience, are considered subject matter experts for a particular line of business, client, or product. The Digital Insights system leverages this expertise by delivering labeling assignments to agents in a manner that minimizes the potential impact to customer service, such as delivering labeling tasks at times when there is excess agent capacity relative to the current volume of customer support requests.

Agent capacity to assist is determined by a Taskability API. The Taskability API considers historical volumes of shared experiences for a given time period to make predictions about expected shared experience volumes for a proceeding time period. For instance, the Taskability API may receive input data consisting of volumes of shared experiences for the same month, day, and time of day for the proceeding two years (i.e., June 1 from 1 p.m. to 1:30 p.m. for the last two years) to predict the expected shared experience volumes for the same month, day, and time of day in the current year. The Taskability API can further receive and process shared experience volume data according to the language of shared experiences relative to the language abilities of agents—i.e., the number of support requests for Spanish-speaking customers relative to the number of Spanish-speaking agents on duty for a given time period. Further, the Taskability utilizes information concerning shared experience volumes for a particular client, site, program, or line of business for a given time period in predicting expected shared experience volumes. The predicted volume data is analyzed along with the number of available agents that are on duty to assist. The Taskability API can also consider agent attributes relevant to the agent's ability to assist, such as whether the agent has sufficient experience with the client, product, program, or line of business to complete labeling assignments for that particular client, product, program, or line of business. When an agent has availability, the Taskability API first conducts a volume prediction analysis to determine expected shared experience volumes relative to the number of agents on duty before transmitting a MicroTask or assignment to the agent computing device.

The labeling assignments are delivered as MicroTasks, which are discrete duties or tasks delivered to agents or other provider personnel that are outside of the ordinary scope of customer service work flow. The MicroTasks are designed as activities that require a limited time for an agent to complete, such between one to five minutes, as opposed to ongoing duties or projects of extended duration. As an example, a MicroTask can be formatted as a five minute segment of a shared experience that is to be labeled. MicroTasks can take other formats as well, such as training modules (discussed below) that are configured to take a few minutes to complete. The MicroTasks can take a variety of formats, including, but not limited to, a link to a web-based interface for performing labeling using an Internet browsing software application.

Figure 7:
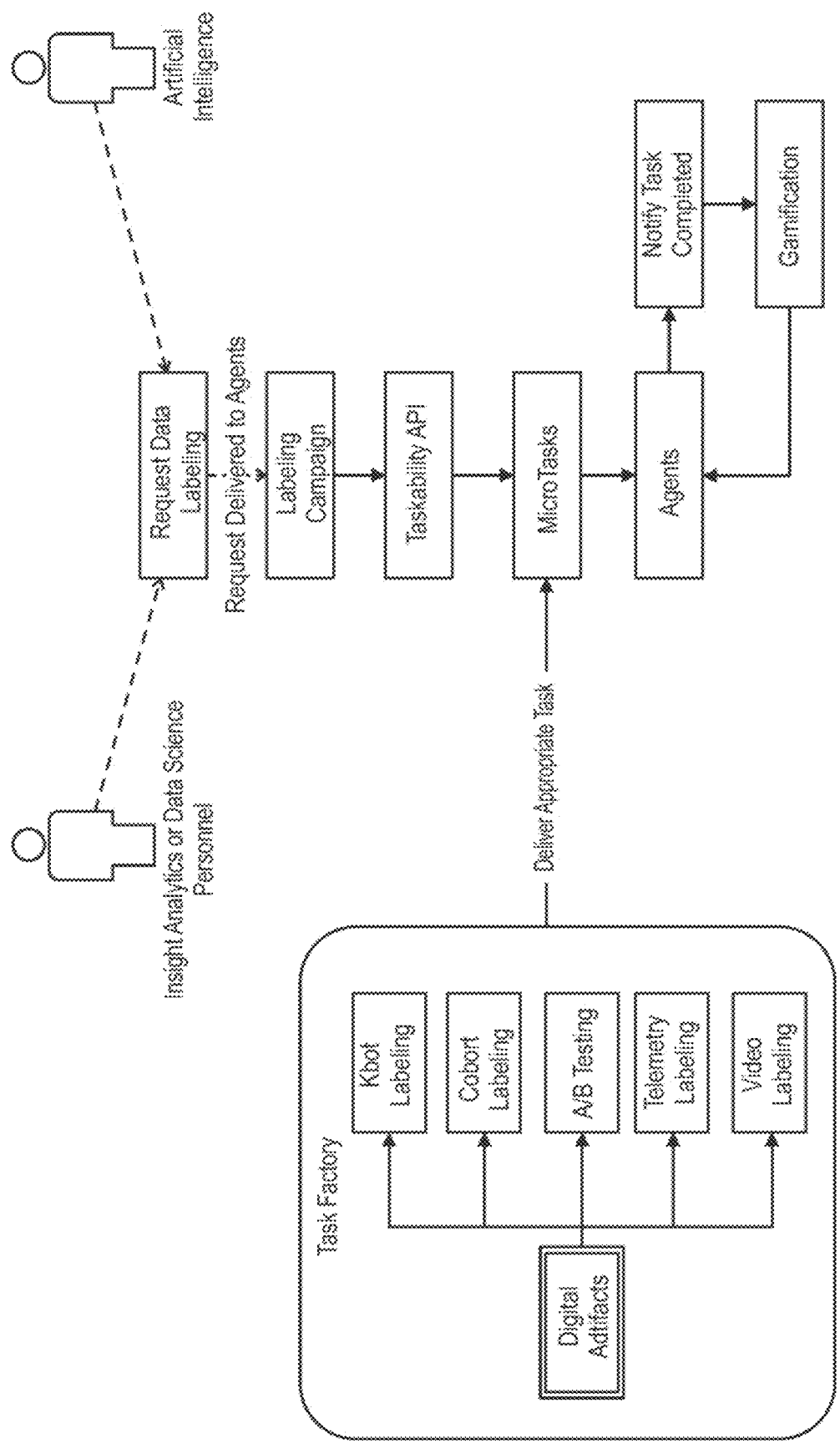
FIG. 7 is an example process flow for implementing a campaign to label Artifact Data or perform other discrete "micro tasks."

The implementation of a labeling campaign is illustrated in FIG. 7 and begins with the Request Data Labeling step where provider personnel or an artificial intelligence process submits a request to label Artifact Data. Next, a Taskability API identifies agents who have suitable experience and capacity to perform labeling tasks. At the MicroTask step, available agents are asked to perform a specified MicroTask assigned by the Task Factory. Assigned MicroTasks can include both labeling and other types of discrete tasks and duties, such as labeling video data, labeling telemetry and event data, participating in Hypothesis Testing through an AB experiment, participating in Kbot Knowledge Curation, or participating in Knowledge Bot Knowledge Curation. As agents complete the MicroTasks, the MicroTasks are marked as complete at the Notify Task Completed step. In the embodiment shown in FIG. 7, marking the MicroTask as complete takes the agent to a Gamification step where the agent may receive rewards to incentivize participation in MicroTasks.

As more Artifact Data is gathered and labeled by the Digital Insight system, additional parallel processes can be used to model and train the algorithms for performing the labeling analysis so that future shared experiences can be labeled algorithmically. In a first process, the Customer Interaction Type is labeled through neural networking techniques with neural networks that have been trained with previously labeled and vectorized Artifact Data. The various categories of Artifact Data are used as inputs to a neural network where the individual nodes represent probability functions and the connections between nodes represent weights assigned to each node input/output. The system may use multiple trained neural networks with separate neural networks used to label the interaction segment, the client Process, or customer interaction type, for example.

To illustrate the use of neural networking techniques, the system might recognize that incoming customer services requests relating to a particular line of business, client, and/or product, as determined from the captured telemetry data, have a high probability of having a Customer Interaction Type of "technical support." Further, these factors might carry different weights in the analysis. That is, for a given line of business and product type, manufacturer "A" might experience higher frequencies of technical support requests than other manufacturers. In that case, the captured Artifact Data identifying the client as manufacturer "A" would carry a higher weight in the input to the probability function relating to whether the Customer Interaction Type is "technical support."

The neural networks are trained through Artifact Data that has been previously labeled and analyzed to determine the probabilities that shared experiences will be of certain Customer Interaction Types, like refund requests, new purchase requests, or technical support requests. The previously labeled Artifact Data is input into a neural network, and the Customer Interaction Type probabilities are calculated and compared against the previously calculated known values to determine an error rate. The weights of the neural network node connections can then be adjusted and the probabilities recalculated to reduce the error rate. The process is repeated iteratively until the error rate is minimized to a satisfactory threshold.

The labeling analysis can use trained neural networks to recognize and apply other labeling categories, such as Customer Interaction Segments or client Processes. For instance, a given client process might require that a product model number be entered into a support ticket database interface as part of the client-required trouble-shooting Process during the Issue Resolution Segment. Thus, when the captured Artifact Data indicates a shared experience relates to that particular client and the agent entered a model number into the support ticket database, then those factors would weigh heavily in the probability analysis determining that the Customer Interaction Segment is Issue Resolution and the Process is "trouble shooting."

Alternatively, some embodiments of the system may use Bag-of-Words modeling techniques to algorithmically determine Customer Interaction segment. Bag-of-Words modeling techniques utilizes the presence, number of occurrences, and/or frequency of particular words in the written transcript data as well as Bayesian or other probability analysis functions to calculate the probabilities that portions of the shared experience will be of a particular Customer Interaction Segment type. For example, the presence or frequency of the words "hello" or "hi" might be indicative of the Opening segment while words such as "diagnostic" or "problem" might be associated with the Issue Description segment or a given client's trouble-shooting Process.

Those of skill in the art will appreciate that the labeling analysis can utilize other suitable probability modeling, sentiment analysis, or natural language processing techniques to categorize a shared experience. In another parallel method, the Insight Analytics process can perform a more detailed analysis of the video and audio data for the various Customer Interaction Types and Customer Interaction Segments. The detailed analysis likewise utilizes neural networking techniques and Bag-of-Word models to develop algorithms for automatically labeling Processes and Tasks during a shared experience. In some embodiments, the Insight Analytics process relies on a Process Capture application to gather additional event, telemetry, audio, and video data that is accompanied by audio annotation data. The audio annotation data is an agent's description of the Processes and Tasks performed during the shared experience. The Process Capture application then utilizes the audio annotation data to generate Robot Process Automation ("RPA") code for automating various Processes. As an example, the additional event, telemetry, audio, video data, and annotation data can be used to program RPA code that automates the Tasks performed in issuing a refund according to a client-specified Process when the system recognizes that the Customer Interaction Type is a customer refund request.

Opportunity Evaluator

The Digital Insights system utilizes an Opportunity Evaluator Process to analyze the labeled Artifact Data to identify potential opportunities for improving the shared experience. The shared experiences can be improved by optimizing, augmenting, and enhancing the Processes used during a shared experience. The Digital Insight system has the advantages over conventional systems that the improvement opportunities can be evaluated using evidenced-based techniques, and the system can analyze the added value for improvement opportunities.

Figure 8:
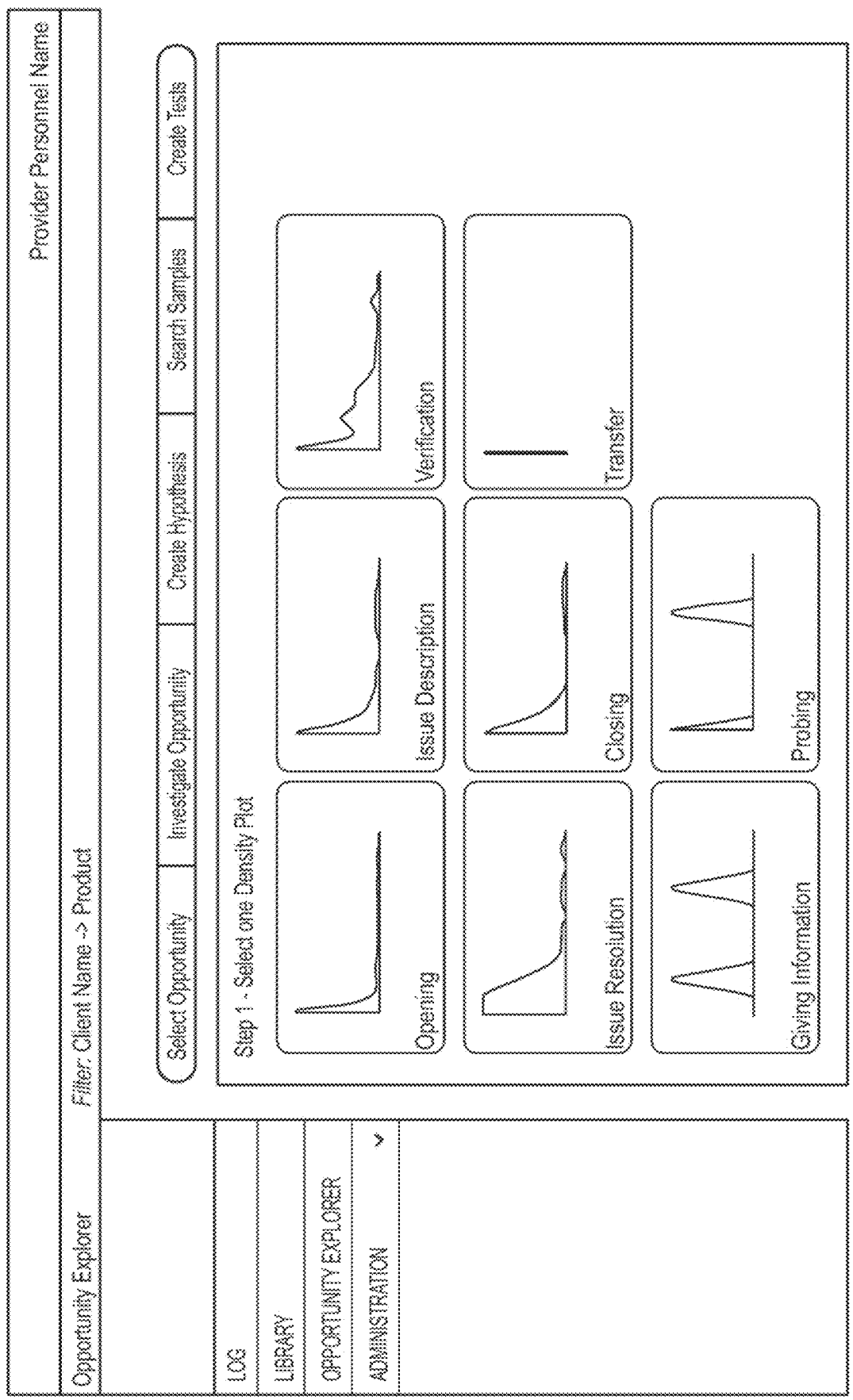
FIG. 8 is an example graphical user interface for reviewing Artifact Data to investigate potential improvement opportunities.

The Opportunity Evaluator Process utilizes an Opportunity Explorer display interface, such as the example interface shown in FIG. 8, to search for potential improvement opportunities. The Opportunity Explorer display interface in FIG. 8 shows a multitude of density plots representing the frequency of particular identified labels (vertical axis) as a function of time (horizontal axis) during analyzed shared experiences. For the Opportunity Explorer display interface in FIG. 8, each density plot represents the distribution of various Customer Interaction Segments over a continuous time interval. Utilizing the Select Opportunity function, provider personnel can select a particular density plot to review the density plot details popup display interface, such as the details of the Issue Description density plot depicted in FIG. 9.

Figure 9:
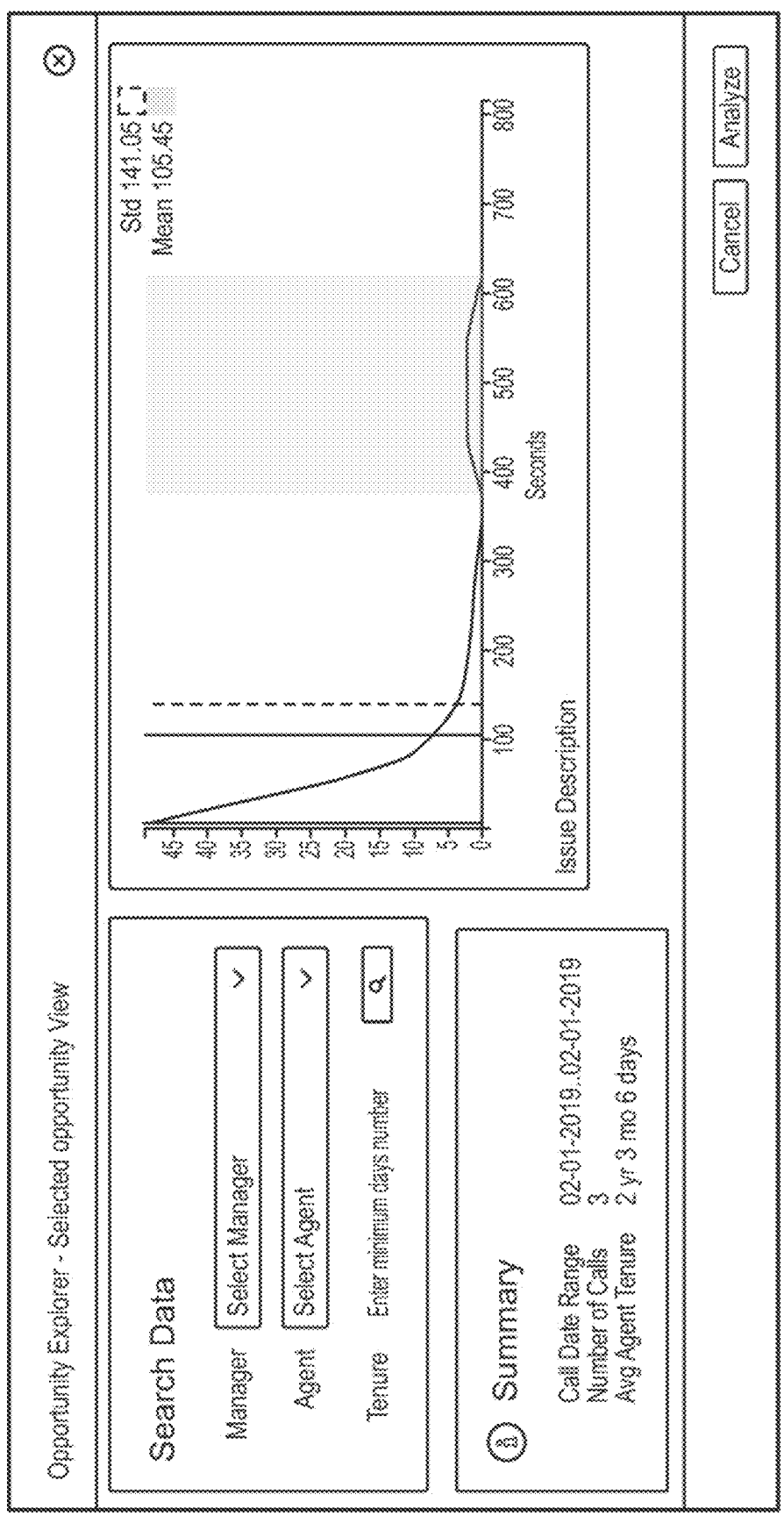
FIG. 9 is an example graphical user interface for analyzing details of a density plot of labeled Artifact Data as a function of time.

The density plot details display interface depicted in FIG. 9 enlarges the selected density plot and permits the data to be filtered by particular categories, such by agent, agent tenure, the identity of the agent's manager, or any other useful category. The underlying Artifact Data is filtered using drop down menus that display the shared experience Artifact Data for only the selected filter categories. A summary of the filtered or unfiltered data can also be displayed indicating, for instance, the dates over which the shared experience Artifact Data was gathered, the number of shared experiences represented in the data, or the average agent tenure for the agents that engaged in the shared experiences. The density plot details display interface can also display statistical data, such as the mean or standard deviation.

The density plot details display interface can be used to select particular portions of the density plot for further analysis. Portions of the density plot are selected, and statistical data for the selected portions is provided, such as the mean or median for the selected portion. This feature is useful for reviewing particular portions of interest representing potential opportunities for improvement. To illustrate, the density plot details display interface in FIG. 9 represents a bimodal distribution for the Issue Description Segment where the Issue Description Segment typically occurs in the first approximately 100 seconds of a shared experience, but a second maximum appears at about 500 seconds. Statistical summaries and the underlying data for the second maximum can be reviewed by selecting the portion of the data surrounding the second maximum and then selecting the Analyze function on FIG. 9.

Figure 10:
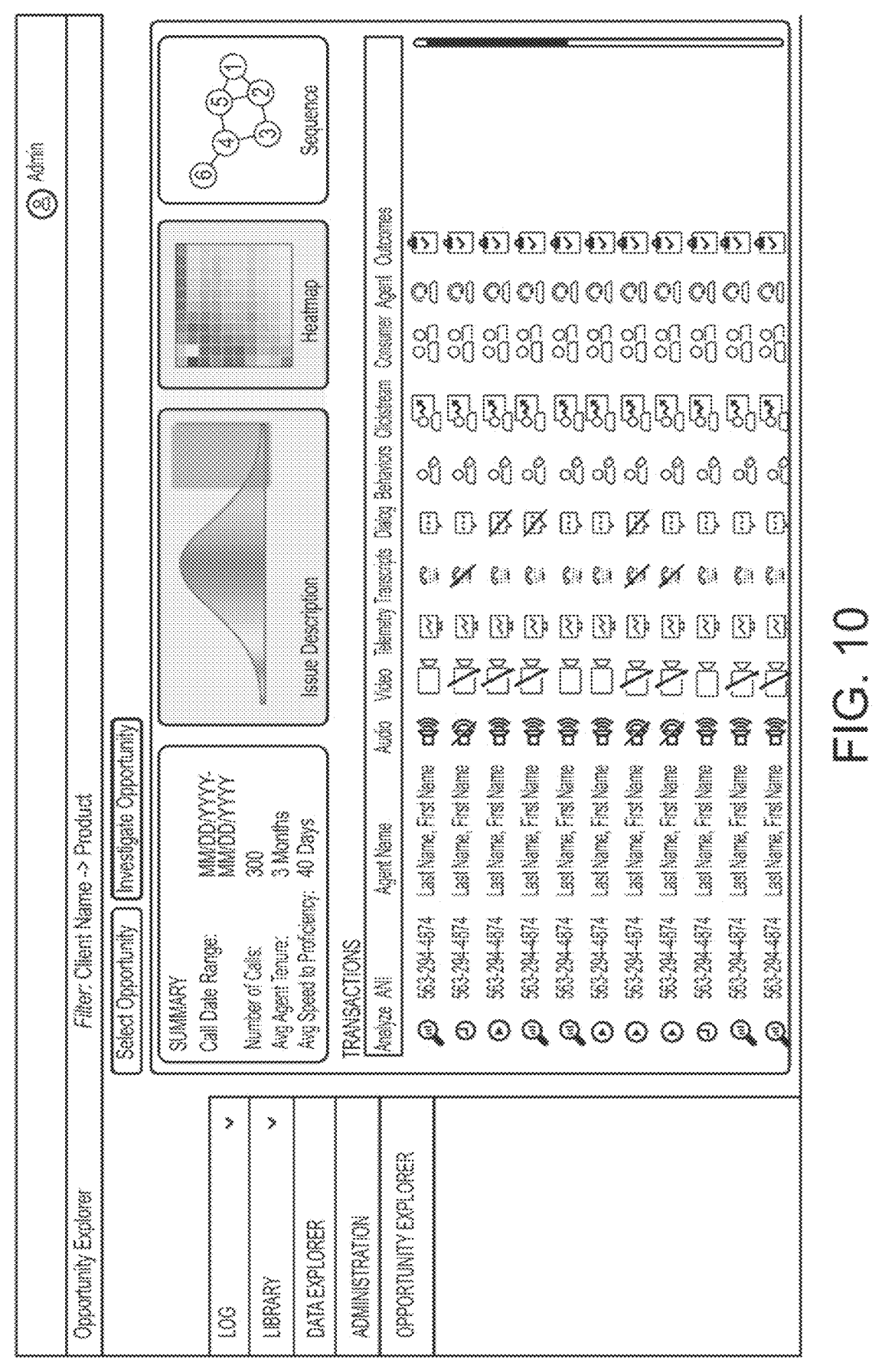

Selecting the Analyze function brings up the Investigate Opportunity display interface shown in FIG. 10. The Investigate Opportunity display interface includes a summary of the underlying Artifact Data, a statistical plot, a heat map, a sequencing plot, and a Transactions table with various functions for reviewing the underlying Artifact Data. The statistical plot, heat map, and sequencing plot depicted in FIG. 10 can be implemented as thumbnail images that, when selected, will initiate additional display interfaces for reviewing the data in more detail.

The Artifact Data summary displays information, such as the date range of the shared experiences, the number of shared experiences in the underlying data, the average agent tenure, and the speed to agent proficiency. The summary data can be useful for identifying trends in the data where improvement opportunities might present themselves, like revealing that the second peak at 500 seconds in the Issue Description is associated with agents having a relatively short tenure of only three months. This permits a provider to develop hypothesis for testing potential improvements, such as a hypothesis that additional training for new agents with regard to the Issue Description segment might eliminate or reduce the second peak at around 500 seconds.

The heat map can be a diagram of the frequency of various events and transactions in the event data (vertical axis) over time (horizontal axis). To illustrate with reference to the heat map depicted in FIG. 10, it could be the case that the map appears darker in the upper left portion indicating that a set of events typically occurs with relatively high frequency at the beginning of the Issue Description Segment, like an agent searching for a named product or entering customer information in a database.

Similarly, the sequence plot can also represent the frequency of particular events as determined from the event and other Artifact Data as well as the order of occurrence for the events. The frequency or number of occurrences for certain events can be indicated by the size of the nodes or size of the node connectors while a typical order of events is indicated by the node numbering and connectors. The sequence plots can be useful for identifying and hypothesizing Process improvements relating to the ordering or automation of Tasks in a Process, among other types of improvement opportunities. For example, a sequence plot might reveal that agents typically search a customer's order history immediately after receiving customer information during customer identity verification. The provider could then develop and test a hypothesis that automatically displaying customer ordering history would save an average of 3 minutes during a shared experience and/or lead to a 10% increase in sales.

The Transaction table in FIG. 10 makes a wide variety of underlying Artifact Data available for review relating to the individual shared experiences being reviewed, including customer telephone numbers, agent names, audio data, video data, written transcript data, behavior data, agent and customer attributes (e.g., agent tenure), clickstream data (e.g., webpages visited prior to selecting a hyperlink to initiate a customer service request), and the outcome of the shared experiences. The Transaction table allows a more detailed review of the data that can be useful for identifying trends that might not be visible in the various plots and graphs. For example, reviewing the tabulated data for shared experiences having a negative outcome might reveal that many of the negative outcomes are associated with click stream data where customers visited the client's Frequently Asked Questions webpage. The provider might develop a hypothesis that updating the Frequently Asked Questions webpage will reduce negative outcomes by 10%.

Figure 11:
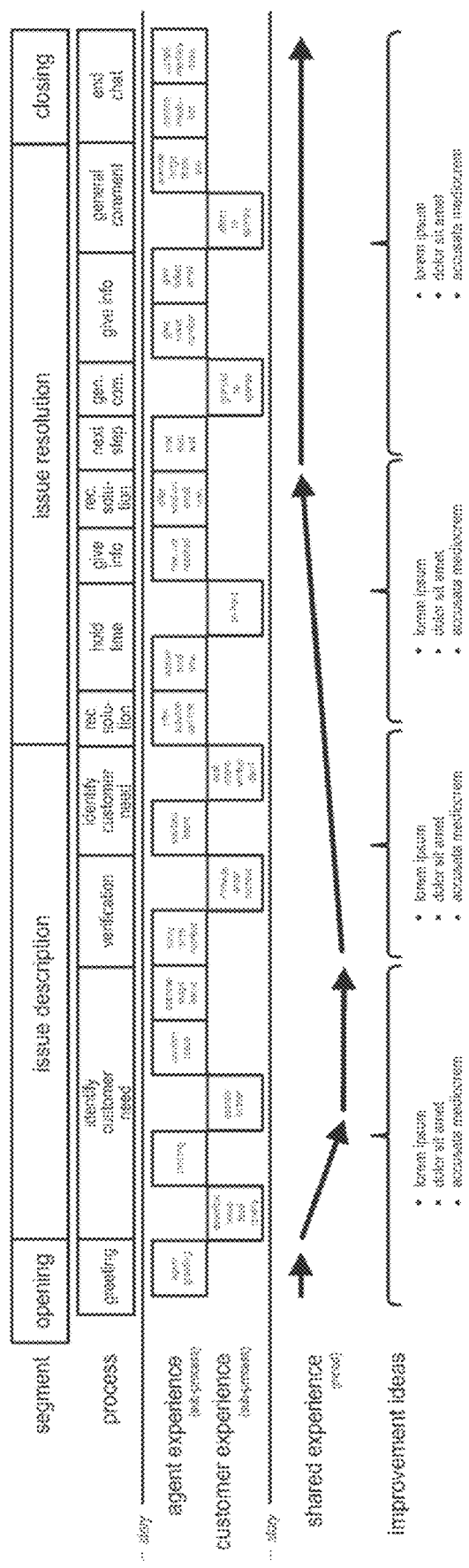
FIG. 11 is an example Experience Map graphical user interface that depicts the timeline of a shared experience and potential improvement recommendations.

The Opportunity Evaluator process can also include a function that displays an Experience Map that graphically depicts customer shared experiences and makes recommendations for augmentation, optimization, and improvement opportunities. An example Experience Map display interface is illustrated in FIG. 11. The Experience Map display interface can utilize individual or aggregated shared experience Artifact Data to graphically depict the timeline of a shared experience broken down by Customer Interaction Segments, client Process segments, Tasks, agent Sentiment, and/or customer Sentiment, or any other useful representation of the shared experience.

The Opportunity Evaluator can further include a Recommendation Engine that displays recommendations as improvement opportunities or "improvement ideas" graphically correlated to various Customer Interaction Segments and Processes, as illustrated in FIG. 11. Recommendations can alternatively be displayed as tiles with relevant information quantifying and categorizing the improvement opportunities, as illustrated in the Analyze Opportunity display interface shown in FIG. 12.

The Recommendation Engine can be implemented as a rules-based software process or as software that performs statistical analyses using machine learning techniques to automatically analyze the Artifact Data underlying the shared experiences. The machine learning techniques can include trained neural networks that accept labeled Artifact Data as inputs and outputs recommended opportunities based on patterns in the Artifact Data. The output of the Recommendation Engine can include a recommendation, such as the use of Precision Coaching, implementing Robotic Process Automation, recommending that agents pitch the sale of a product or service to a given type of customer, or recommending the implementation of particular steps for addressing a technical issue underlying a customer service request. The Recommendation Engine analysis output can additionally include information that quantifies the recommendation, such an estimated cost savings, an estimated improvement in Average Handle Time ("AHT"), improvement in some other agent Performance Metric, or a probability that the recommendation will succeed in improving performance.

In one embodiment, the Recommendation Engine evaluates the distributions and absolute values of Artifact Data with reference to factors such as AHT, First Call Resolution ("FCR"), and Customer Satisfaction ("CSAT"). The distribution and absolute value of the Artifact Data can be represented graphically, such as the density plots shown in FIGS. 8 and 9, where the distribution refers to the overall shape of the plot curves and the absolute value refers to the span of numerical values in the Artifact Data (e.g., the duration of time over which a curve spans or peak value of the Artifact Data represented in the curve).

AHT refers to the overall duration of a shared experience or segment of a shared experience. The FCR represents the proportion of shared experiences where the Customer Intent or objective was satisfied during the first shared experience attempt (e.g., successful sale or technical support resolution on a first call). CSAT is an indicator of the customer's satisfaction with the overall shared experience considering the resolution, duration, or other factors. FCR and CSAT can be measure by, for instance, customer satisfaction surveys or Artifact Data input by an agent following a Shared Experience as part of an ACW process where agents input data concerning a recent shared experience.

The Recommendation Engine can additionally consider the type of Artifact Data, such as whether the Artifact Data represents telemetry data or audio data formatted as written transcript data or "dialog." Generally, Robot Process Automation improvement recommendations are more suitable for narrow distributions of telemetry type Artifact Data indicating that agents are performing approximately the same tasks in the same time period. On the other hand, Robot Process Automation may be less suitable as an improvement opportunity recommendation for written transcript type Artifact Data where Robot Process Automation might entail the automation of dialog that could just as easily be spoken by a human agent over the same time duration. Precision coaching can be more effective as an improvement recommendation for wider distributions of telemetry type or written transcript type Artifact Data, where the performance of agents on the tail ends of a distribution are potentially improved through targeted, personalized training.

The Recommendation Engine analysis can be better understood with reference to the following simplified examples where the Recommendation Engine is implemented by a rules-based software engine. The Recommendation Engine may be programmed to include a rule that analyzes AHT to identify: (i) telemetry type Artifact Data, such as steps taken to search a customer's order history or searching a manual for resolution to a customer inquiry; (ii) "narrow" bell curve distributions of Artifact Data where 95% of the Artifact Data falls within a specified duration, such as one minute; and (iii) "tall" distribution curves where the number of occurrences is large and set to a particular threshold (i.e., a 1,000 searches—most of which occur within one minute). In that case, the narrow distribution is interpreted as indicating that most of the shared experiences involve agents performing approximately the same tasks in the same time frame to accomplish the searching so that the tasks might be suitable for performance by Robot Process Automation at a faster rate, thereby reducing AHT. The "tall" distribution is interpreted as indicating that agents frequently perform the tasks during a shared experience such that the Robot Process Automation might be useful for improving AHT for a large number of shared experiences indicating that the improvement recommendation is more advantageous (i.e., has a more favorable cost/benefit). The Recommendation Engine might utilize the one-minute threshold for the reason that distributions spanning less than a minute do not present significant improvement opportunities for reduced AHT.

In another example, the Recommendation Engine might include a rule that analyzes AHT to identify: (i) Artifact Data where a shared experience segment spans longer than five minutes representing a "wide" bell curve distribution; and (ii) the Artifact Data represents a "tall distribution" over a large number of shared experiences. The wider distribution is interpreted as indicating that a certain percentage of agents on the tail end of the curve are taking too long or moving too quickly through shared experience segment, and the "tall" distribution indicates that an improvement to AHT would impact a significant number of shared experiences. As another example, the above rule might be modified to analyze AHT to identify instances where a certain percentage, such as 25%, of shared experiences last longer than five minutes. In either case, the output of the Recommendation Engine might be that precision coaching has a high probability of effectively promoting consistency or reduction in AHT for agents at the tail ends of a distribution.

In other embodiments, the recommendation engine may examine FCR or CSAT to determine instances where either metric falls below specified thresholds, such as where 25% of CSAT scores fall below a "5" on a 10-point scale or where FCR falls below 75%. The Recommendation Engine might recommend precision coaching to improve the agent performance during the Issue Resolution segment to increase FCR or to improve agent Behavior and Sentiment to increate CSAT.

The Recommendation Engine can further utilize linear programming techniques to optimize AHT, CSAT, and FCT to the extent that the metrics are interrelated. To illustrate, a reduction in AHT might improve CSAT as customers are more satisfied with faster handle times. But a reduction in AHT might also lead to a decrease in FCR if agents are not taking adequate time to fully address the customer Intent or objective of a shared experience. Linear programming techniques that model AHT, CSAT, and FCR and that utilize specified constraints are used to balance the metrics to find, for instance, an improved AHT that does not cause FCR to fall below a specified threshold.

Figure 12:
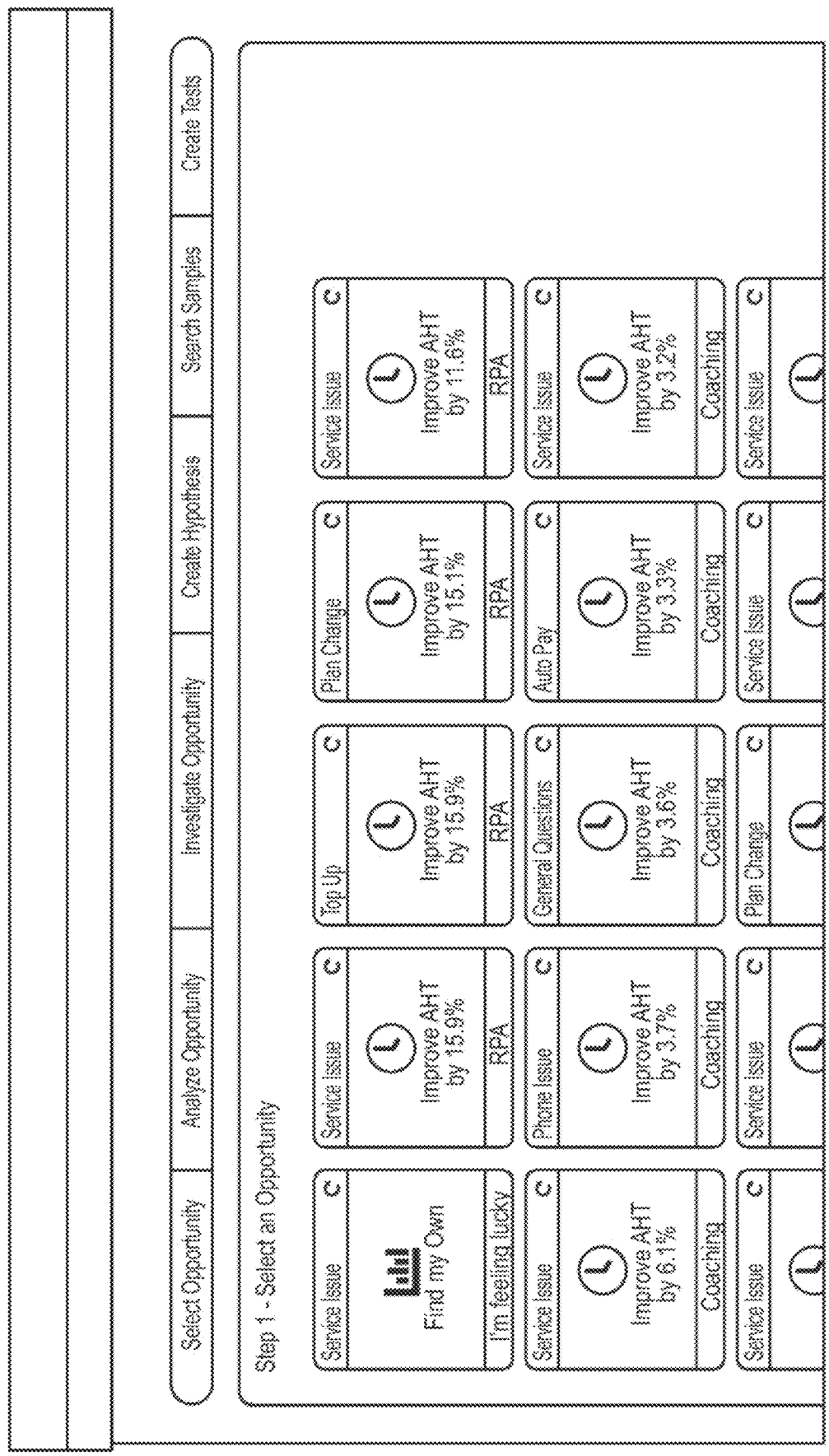
FIG. 12 is an example Select Opportunity graphical user interface that displays potential improvement opportunities.

The improvement recommendations identified by the Recommendation Engine can be displayed graphically as tiles on a Select an Opportunity interface, such as the user interface shown in FIG. 12. The improvement recommendation, as determined at least in part by the Artifact Data distribution and type, is displayed at the bottom portion of the tiles in FIG. 12 indicating whether Robotic Process Automation or precision coaching is recommended. Assuming, for instance, that Robotic Process Automation generally saves 50% of AHT and precision coaching saves approximately 25% of AHT but only for 25% of agents, the Recommendation Engine can calculate an overall estimated improvement for display on the Select an Opportunity user interface. To illustrate, if Robot Process Automation is estimated to save 1 minute on a shared experience segment with an AHT of 2 minutes, and the overall average time of the particular shared experience is 4 minutes, than the 1 minute savings represents a 25% reduction in AHT for display on the tiles of the user interface of FIG. 12.

Figure 13:
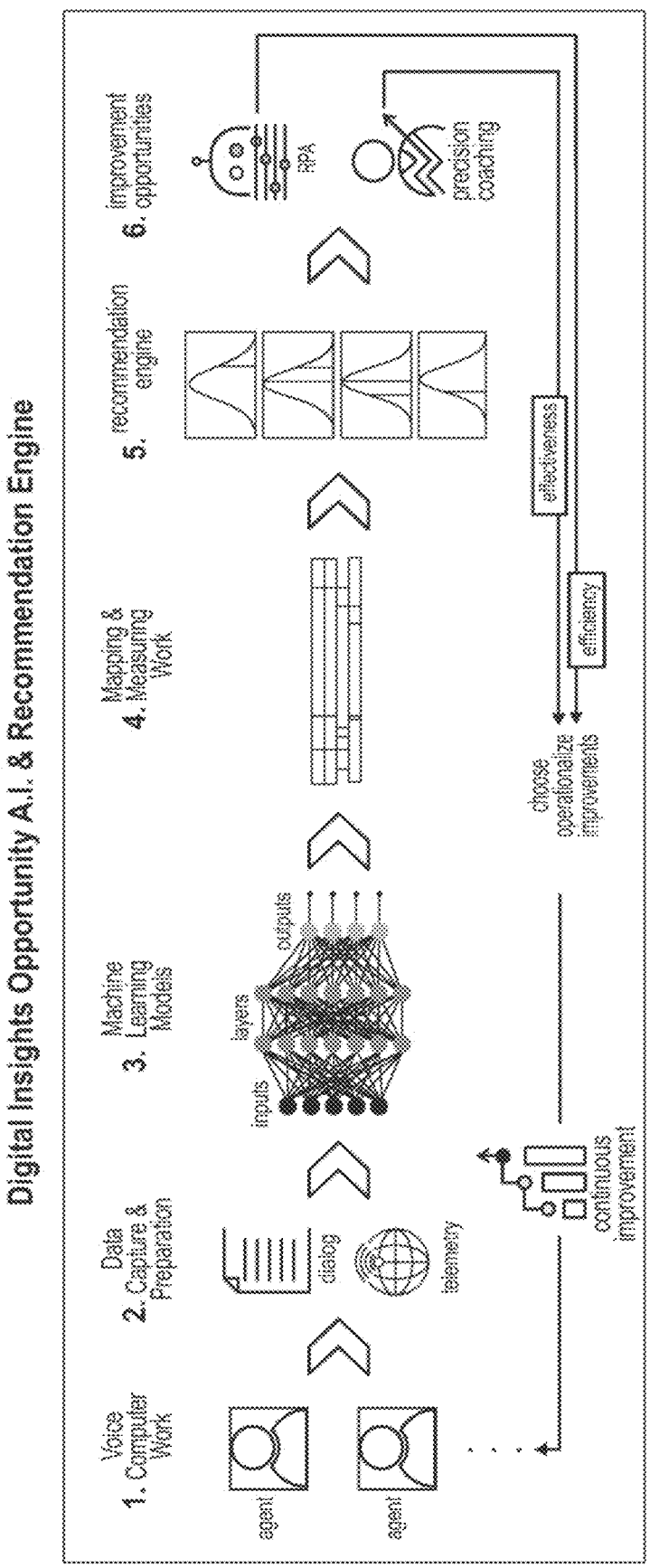
FIG. 13 is an example process flow diagram illustrating a Recommendation Engine in an overall improvement opportunity process flow.

The Recommendation Engine functions to allow a provider to continually identify process improvement opportunities, as illustrated in FIG. 13. As the agents engage in shared experiences at step No. 1 (i.e., Voice Computer Work), the Artifact Data is captured and labeled in step numbers 2 through 4. The Recommendation Engine utilizes the labeled Artifact Data to generate improvement opportunity recommendations at step 6 of FIG. 13 for display in interfaces such as those illustrated in FIGS. 11 and 12. The desired improvement opportunity recommendations are selected and submitted to the Hypothesis Testing process, as described in more detail below. If the Hypothesis Testing process shows that the Success Criteria is met, then the improvement opportunity recommendations can be implemented into the production system at the Continuous Improvement step of FIG. 13.

Hypothesis Testing and Evaluation

Once potential opportunities for augmentation, optimization, and enhancements are identified, hypotheses centered on the potential opportunities are created. Hypotheses generally take the form of a suggested solution, such as a Process improvement or agent action, and an expected result (i.e., Success Criteria) from the suggested solution. A Hypothesis Testing process of the Digital Insights system is then used to develop and implement experiments to test the hypotheses solutions to determine whether the Success Criteria are met. The process flow for creating, running, and evaluating experiments is summarized in FIGS. 14 and 15. The process utilizes the example interface display screens shown in FIGS. 16 through 19.

Figure 16:
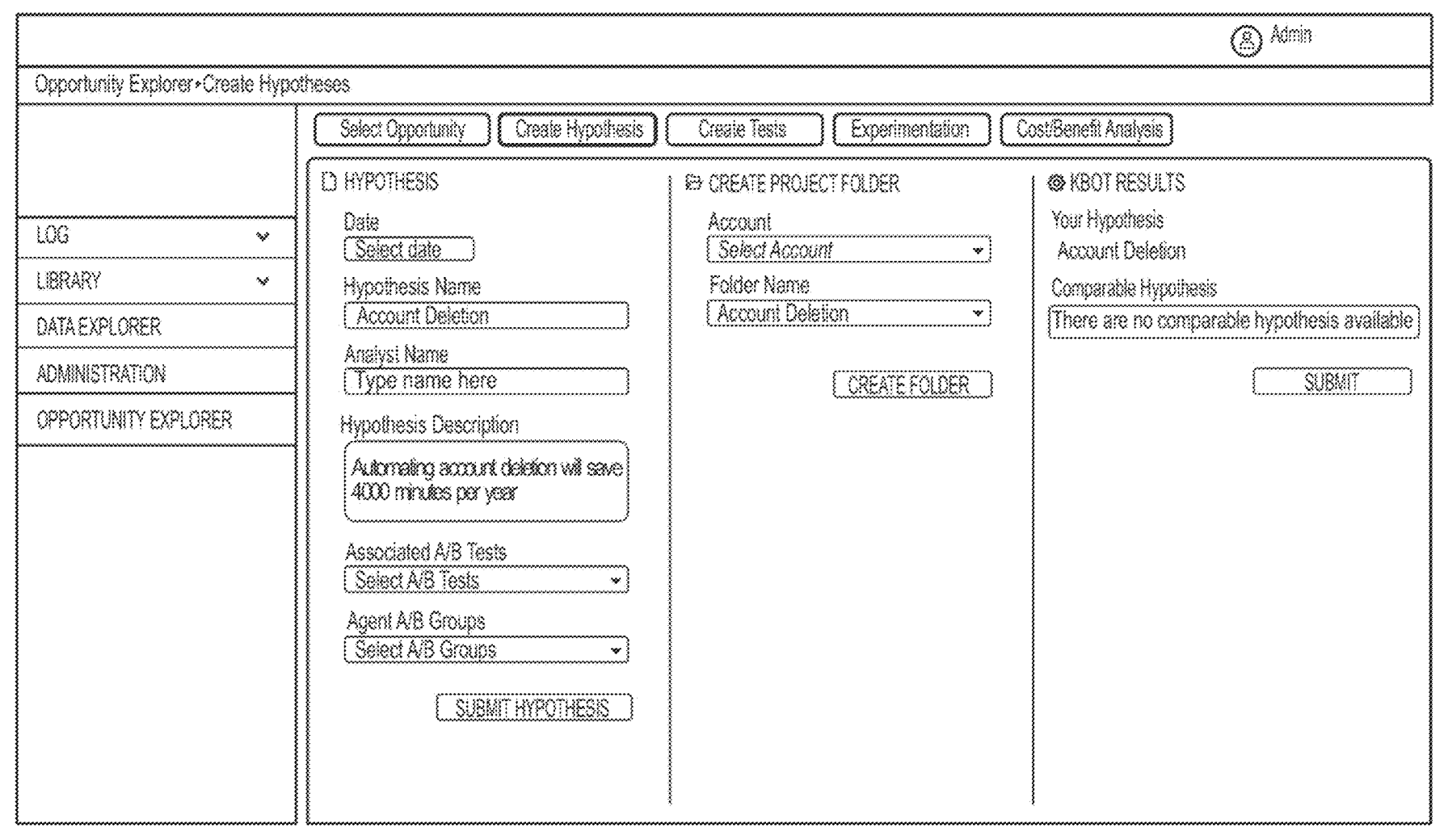

The Hypothesis Testing process begins with entering a hypothesis into the Digital Insights system utilizing the Create Hypothesis function on the Experiment Dashboard shown in FIG. 16. The system is customizable to gather a variety of information including, for example, the date, identifiers for provider personnel responsible for the experiment, an experiment name, an experiment description, a client name, or any other information relevant to designing, documenting, or conducting an experiment.

Once the hypothesis is entered into the Digital Insights system using the Experimental Dashboard, a Knowledge Bot ("Kbot") software application is used to search archived experimental data for existing solutions relevant to the hypothesis. In this manner, unnecessary or duplicative efforts can be avoided if similar experiments have been run or hypotheses tested in the past. If no comparable results are found, an experiment is designed and submitted for approval.

Figure 17:
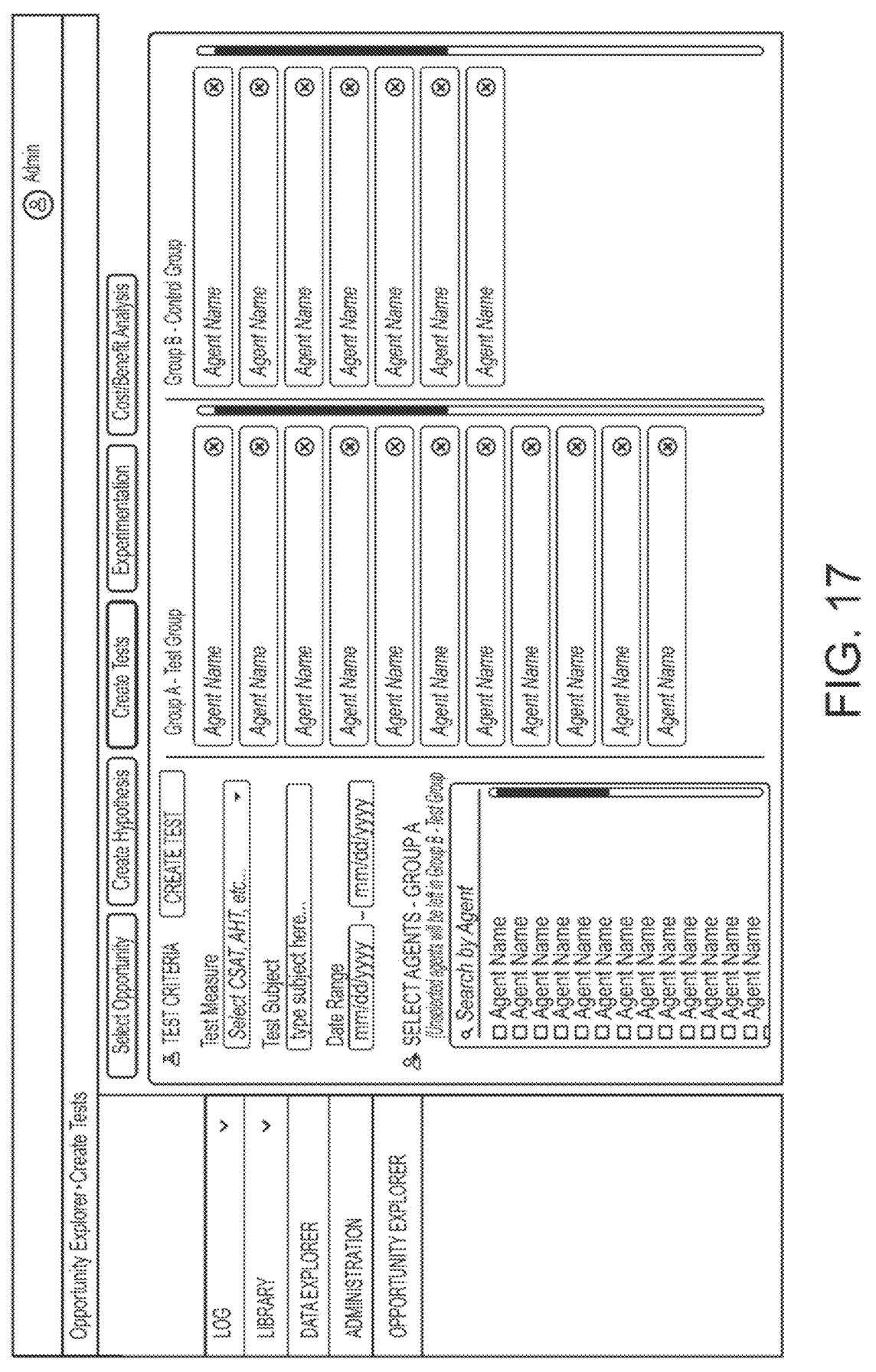

An experiment is entered into the Digital Insights system by selecting the Create Test function of the Experiment Dashboard to display the Create Test interface shown in FIG. 17. The Create Test interface includes input fields for a multitude of experiment parameters, such as a test metrics (e.g., time duration for Issue Resolution segment), the subject of the experiment (e.g., technical support efficiency), the date range over which the experiment will be conducted, success criteria (e.g., a shorter duration for the Issue Resolution segment), and the identity of the agents that will participate in the experiment, among other relevant factors.

A variety of experiment methods can be used to test a hypothesis. The Digital Insights system depicted in the attached figures relies on A/B testing methods, also known as split testing or bucket testing. A/B testing compares two methods for performing the same Process or Tasks with one method typically being the suggested Process improvement and the other being the existing client-required Process. In creating the test utilizing the Create Test interface, separate sets of agents can be assigned to each of the two test groups—the "A" test group using the suggested Process improvement and the "B" control group using the existing Process.

The Create Test function permits an experiment to assign agents to each of the two process methods involved in the testing. Typically, one set of agents will be assigned to utilize a solution set specified by the hypothesis (i.e., the Group A—Test Group in FIG. 17) while the other set of agents is a control group assigned to conduct a client's business using standard operating procedure (i.e., the Group B—Control Group). After an experiment is complete, the results are evaluated to determine whether the hypothesis proved to be correct. A correct hypothesis suggests validation of the proposed augmentation, enhancement, or improvement opportunity that was tested; though other factors are considered prior to recommending the potential opportunity, such as whether the opportunity presents a positive return on investment.

Figure 18:
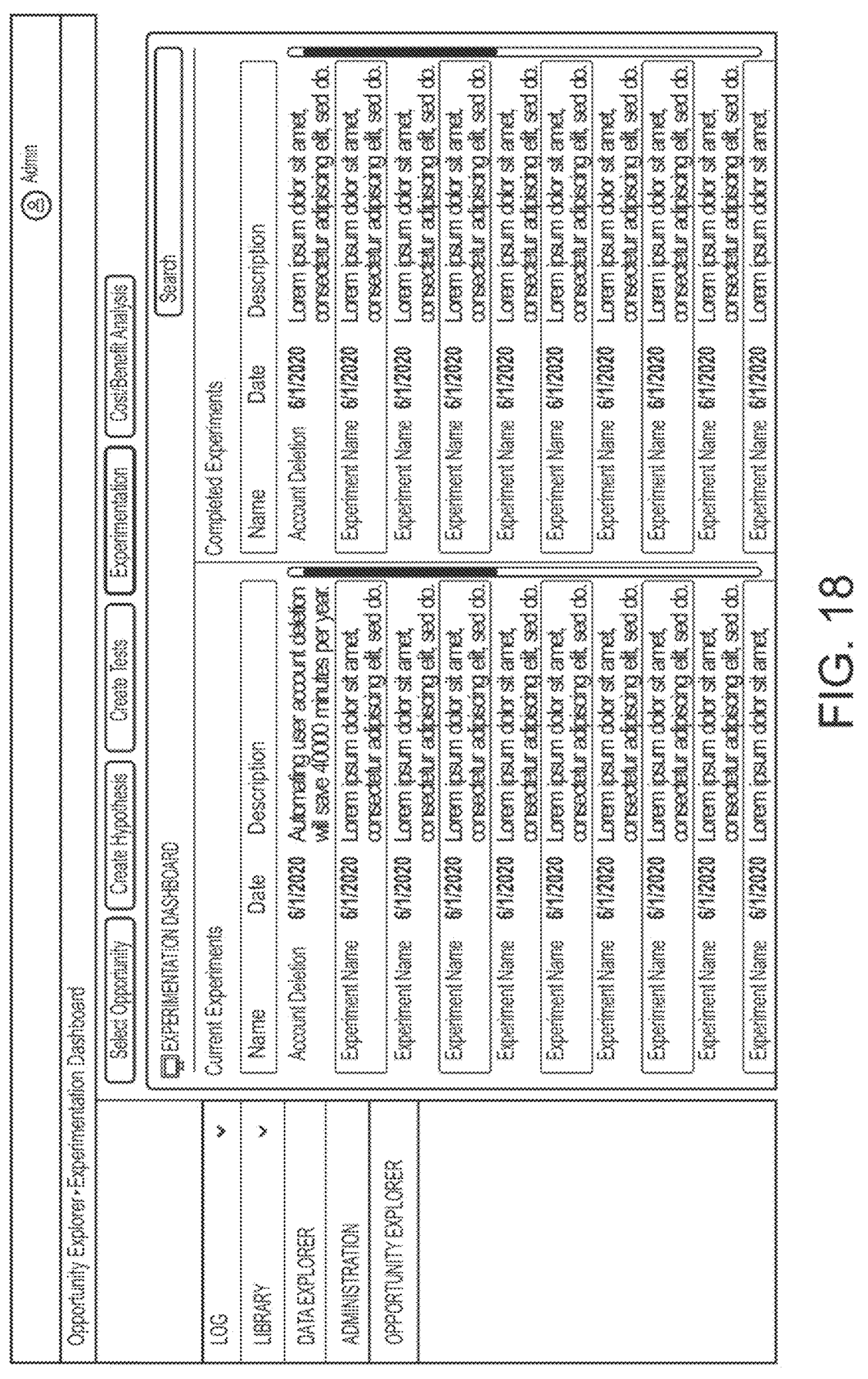

The status of existing experiments, and historical data from prior experiences, is stored to the Digital Insights system and available for review by accessing the Experimentations function depicted in FIG. 18 to display the Experimentation Dashboard display interface. The Experimentation Dashboard display interface permits a user to preview both current experiments and completed experiments.

Hypothesis testing can be illustrated with reference to the simplified example experiment process depicted in FIGS. 14 and 15 where the proposed hypothesis is that a collaborative bot software application ("Cobot") to make customer service recommendations during a shared experience will save approximately 4,000 minutes of handle time per month. The Cobot software application can incorporate machine learning techniques that analyze the Artifact Data in real time, such as reviewing written transcript data, and make recommendations based on the Artifact Data, like recommending potential products to sell or solutions to technical issues described by a customer.

The hypothesis is entered into the Create Hypothesis display interface of FIG. 16 and searched using a Kbot by selecting the "Submit" function under the KBOT RESULTS panel. These steps are shown as the Enter Hypothesis and Search for Existing Solution steps in FIG. 12 and the Create Hypothesis and Search Hypothesis steps of FIG. 13. When no comparable results are found, an experiment is designed and submitted for approval at the Get Project Approval step shown in FIG. 14.

Figure 14:
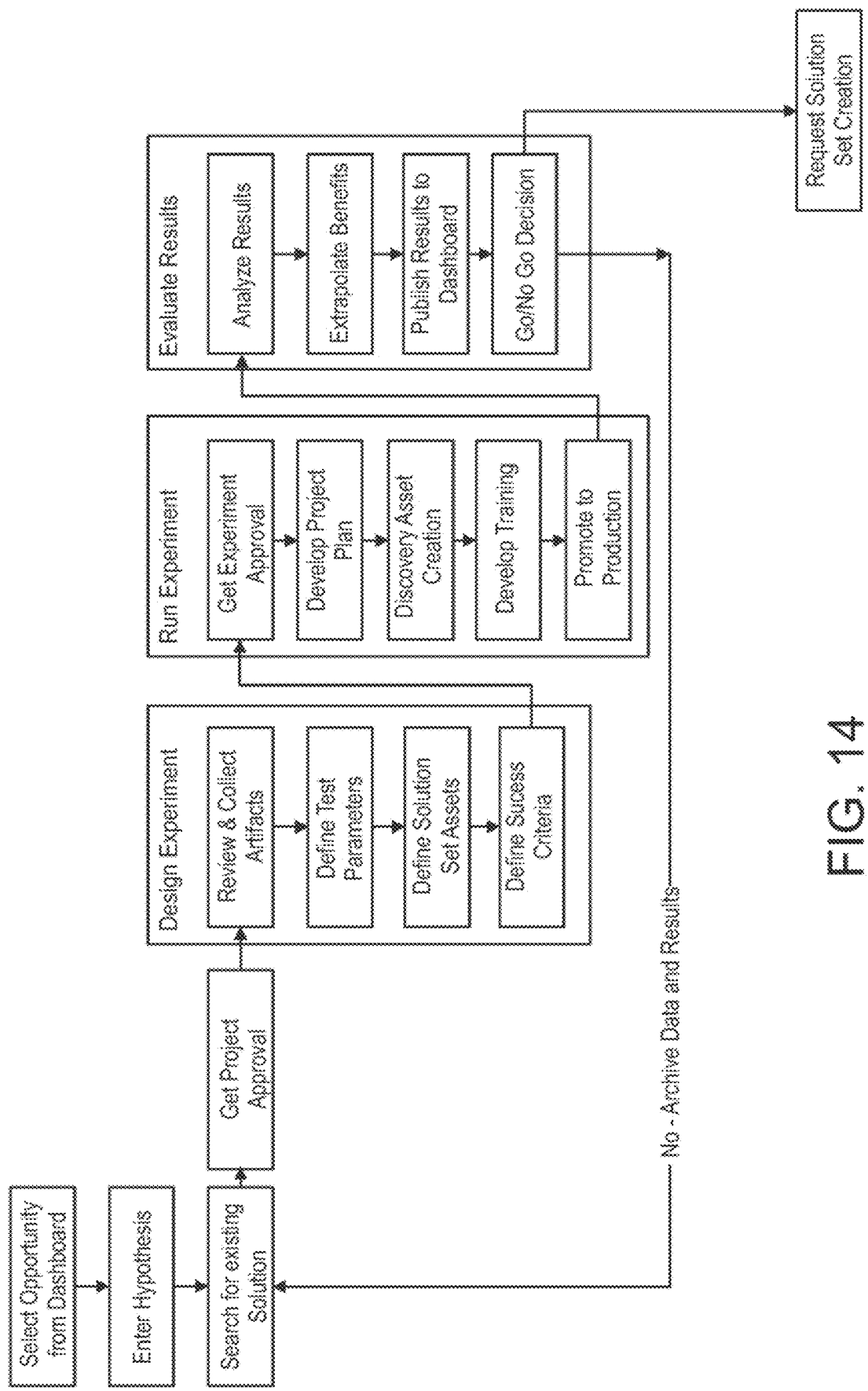
FIG. 14 is an example process flow diagram, according to one embodiment, for designing and implementing an experiment to test a hypothesis relating to shared experience improvement opportunities.
Figure 15:
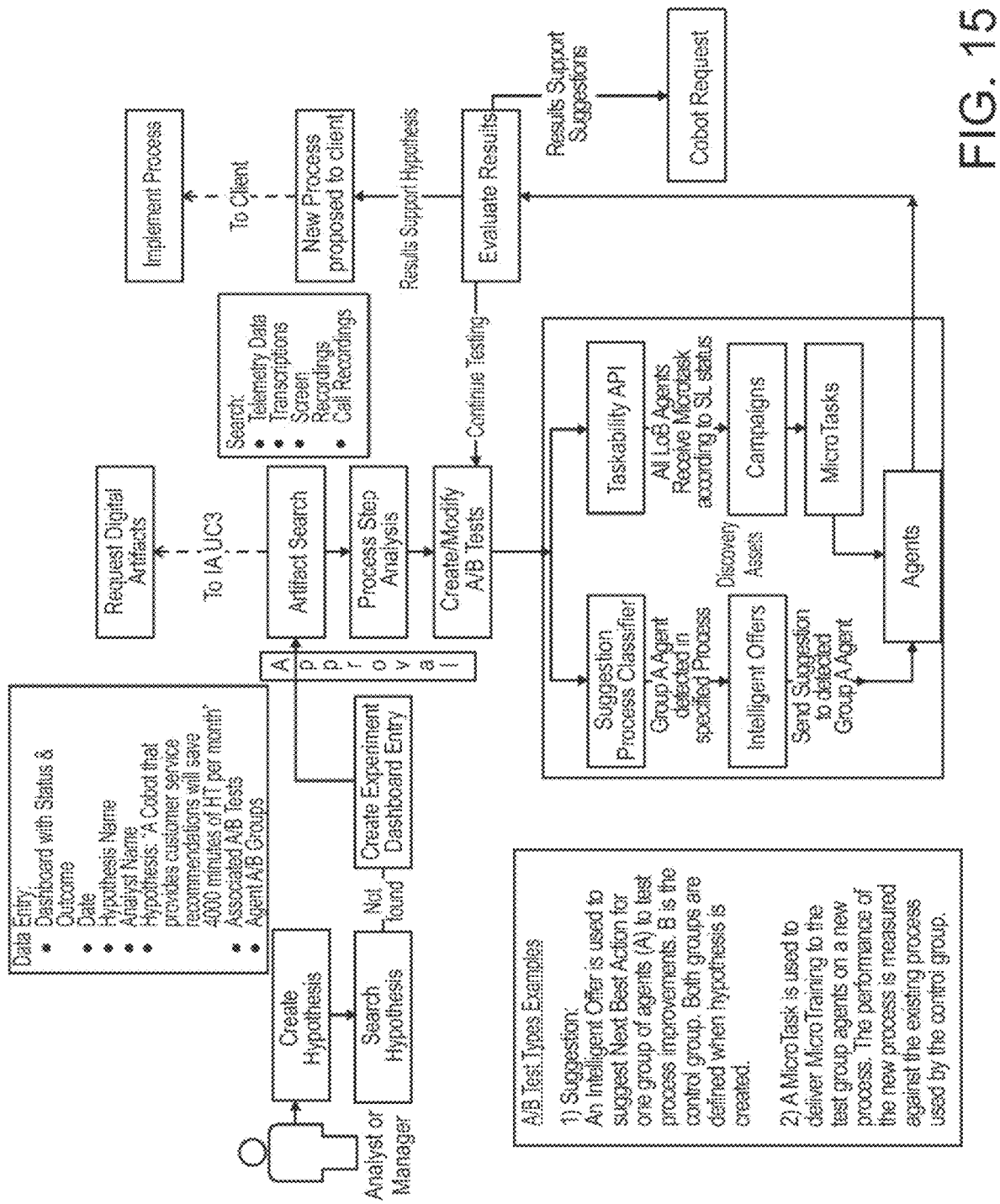
FIG. 15 is an example process flow diagram, according to one embodiment, for designing and implementing an experiment to test a hypothesis relating to shared experience improvement opportunities.
Figure 19:
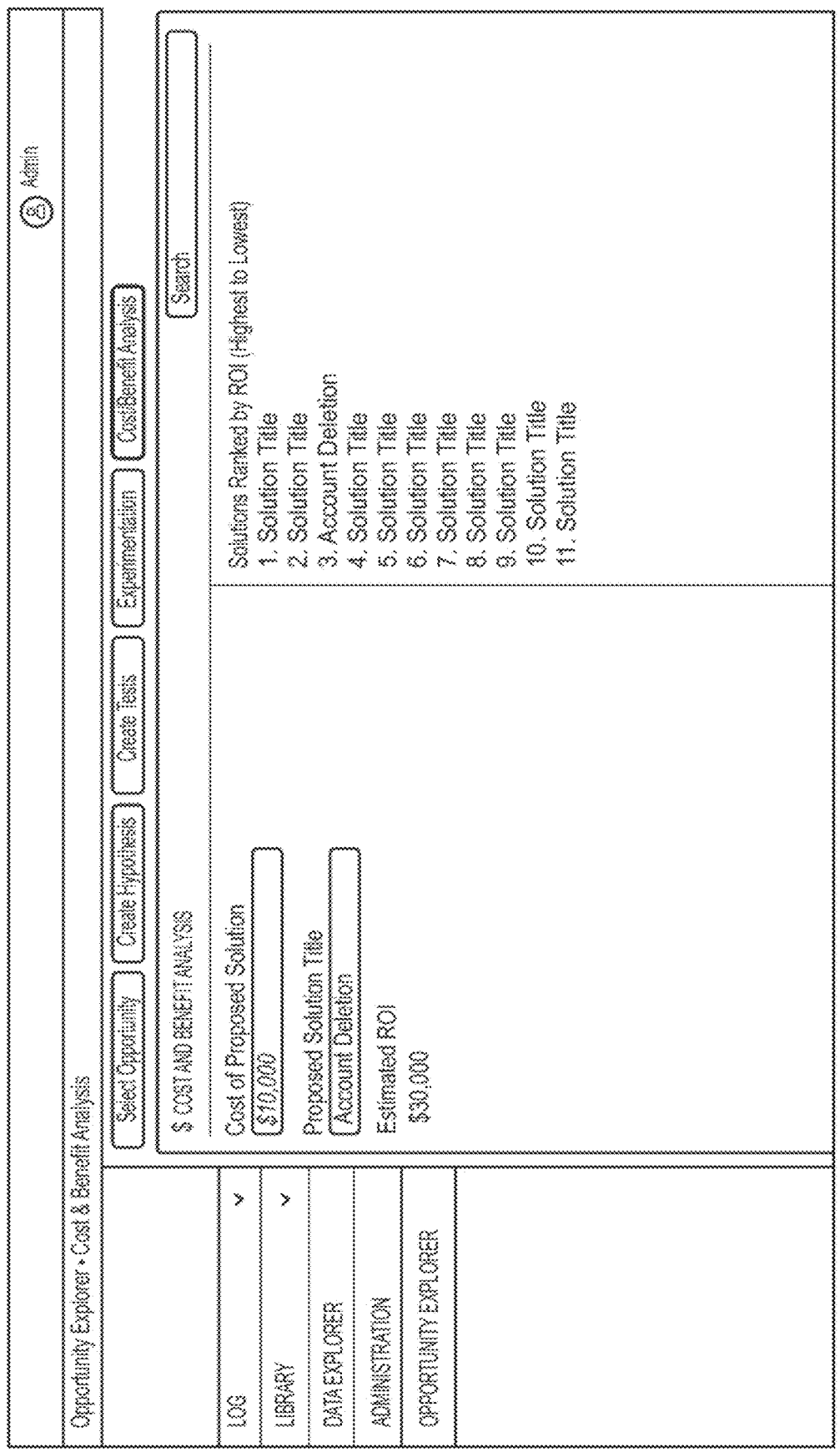
FIG. 19 is an example graphical user interface for performing a Cost/Benefit analysis.

As part of the experiment design, the test parameters are specified, and entered into the Create Test display interface shown in FIG. 17 and as represented by the Design Experiment steps shown in FIG. 14 and the Create Experiment Dashboard Entry step of FIG. 15. Test parameters can include specifying that the experiment will occur during a given time period, involve a given number of agents, a given number of shared experiences, and measure the total time for a particular shared experience segment or other Artifact Data points.

At the Define Solution Set Assets step in FIG. 14, the necessary digital solution set assets, or simply digital assets, useful for implementing the experiment are defined and assigned to the experiment. Digital solution set assets can include, for instance, use of a Cobot or Kbot software application during the experiment. In other embodiments, the digital assets are modular units of knowledge that take a variety of formats, including, but not limited to, text files, portable document format files, web-based interfaces, simulation software applications or executables, or other suitable formats. In some embodiments, the digital asset can be a portable document format readable by an agent to provide instructions for implementing an experiment, or it can be a training software application that provides the agent with information and training helpful for implementing the experiment.

Agents are assigned to participate in the experiment, such as specifying that the "A" test group of agents will utilize the Cobot according to the hypothesis while a "B" control group of agents will utilize the standard client process without the Cobot. The agents may be assigned to group A or B according to a particular provider site, line of business, product, tenure, or other criteria.

The success criteria for the experiment are defined at the Define Success Criteria step of FIG. 14 and are specified as being consistent with the hypothesis, such a success criteria that saving 4,000 minutes per month by the "A" test group constitutes a success. Once the experiment parameters are defined, it may optionally be submitted for approval at the Get Experiment Approval step of FIG. 14 followed by the Develop Project Plan step if approval for the experiment is received.

At the Develop Training step in FIG. 14, micro-training modules are created and distributed to ensure that agents in the A test group are equipped to use the suggested process improvement. The micro-training is distributed as Micro-Tasks to agents in the A test group are delivered through Campaigns that use the Taskability API software application to ensure the micro-training does not interrupt or negatively impact customer service. The micro-training can be implemented as short simulated shared experiences with audio and visual annotations that instruct agents on how to properly utilize the Cobot.

Once trained, the experiment is implemented as part of actual agent work flow at the Promote Production Step of FIG. 14 so that "real-world" evidence is gathered in support of hypothesis testing. As the experiment is performed, Artifact Data is gathered from shared experiences in which the A test group agents utilize the new process and in which the B control group agents utilize the standard process. In this example, the experiment can involve a process whereby an Intelligent Offer software application provides selected agents with an optional opportunity to seek a suggested next best action from the Cobot during a shared experience. During the course of the experiment, if helpful modifications to the experiment design or the process being tested become apparent, the system can be used to modify the experiment before gathering additional data (i.e., the Create/Modify AB Tests step).

When the experiment is complete, the Analyze Results step in FIG. 14 and the Evaluate Results step in FIG. 15 are used to determine whether the Success Criteria were met and the hypothesis turned out to be true or false. The Extrapolate Benefits step of FIG. 14 is used to determine a potential value, or return on investment, for the improvement opportunity. The potential return on investment is available by selecting the Cost/Benefit Analysis function to view the Cost Benefit Analysis display interface depicted in FIG. 19. The Cost/Benefit Analysis function can display information such as the expected cost for implementing an improvement, the potential return on investment for that cost, and a comparison to other potential solutions in testing the same hypothesis or in realizing the same improvement opportunity.

The Cost/Benefit Analysis considers both the potential impact on revenue and costs realized by implementing a particular solution. For instance, continuing with the above example, if a Success Criteria is satisfied that handle time is reduced by 4,000 minutes per month, then available labor cost data can be used with the expected handle time reduction to calculate an expected savings. The Cost/Benefit Analysis can additionally consider potential costs increases as well, such as using labor cost data and potential additional training time required for a solution to calculate an expected labor cost increase. In some cases, the Cost/Benefit Analysis considers revenue impacts as well, such as potential increased sales resulting from an exemplary a solution that uses a Cobot to make product recommendations during a shared experience. The results of the experiment and the Cost/Benefit Analysis are posted to the Experimentation Dashboard interface of FIG. 18.

The Go/No Go Decision step of FIG. 14 examines whether the results suggest that the new process improvement opportunity is beneficial. If so, then the process modification is presented to the client at the New Process Proposed to Client Step of FIG. 15 followed by the Implement Process step if the client elects to implement the modified process. Otherwise, the provider might implement the process for other clients or archive the experimental data for later use, as depicted at the Cobot Request step in FIG. 15. At the Request Solution Set Creation step of FIG. 14, the experiment and Cost/Benefit Analysis results are stored to a database in a format that permits the results to be searched as a solution set in connection with evaluating future hypotheses or in improving Kbot performance, as discussed in more detail below.

Precision Learning Process

The useful applications of the Digital Insight system also include a Precision Learning Process that is configurable to deliver just-in-time, targeted, and effective training opportunities to agents or other provider personnel. The Digital Insights system has the advantages over existing systems that the training can consist of targeted or personalized training modules delivered without disruption to customer service. The system can additionally provide specifically targeted and designed deep learning through Precision Coaching techniques and Spaced Learning, thereby providing additional advantages over existing systems that do not permit such personalized and reinforced learning.

Figure 20:
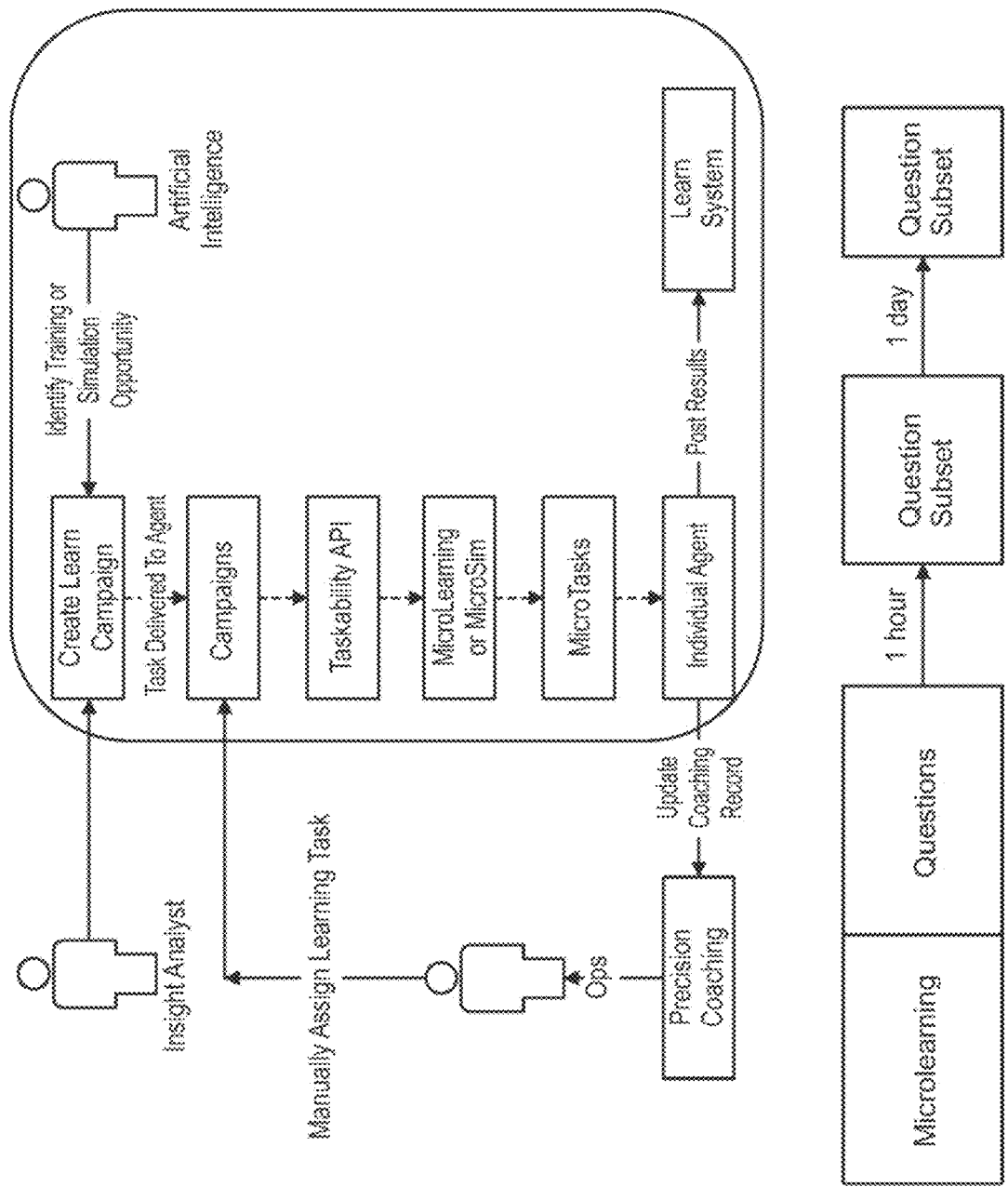
FIG. 20 is an example process flow diagram for a Precision Learning Campaign.

The process flow for precision learning is depicted in FIG. 20. The training materials are generated using Artifact Data from actual shared experiences. The materials are searched, examined, and selected to identify audio, video, and other data from both advantageous and cautionary examples of shared experiences. The selected Artifact Data is submitted to a Precision Learning Content Creation Tool application where the Artifact Data is combined with knowledge base entries, preexisting library materials, and/or other sources to create targeted simulations and other efficient and effective training modules.

The training modules can comprise instructions to be performed by the agent and/or agent computing device, such as displaying, receiving, and evaluating answers to questions, displaying knowledge assets, or running a shared experience simulation. The training module can track training results from the performance of training modules, such as the number of questions answered correctly and incorrectly, the topic of the questions answered incorrectly, the length of time it takes to complete a question or training module, or other useful performance metric. The training module can be comprised of one or more digital assets, which again are module units of knowledge that can take a variety of forms. The digital assets can be informational displays through text, portable document format files, web-based interface displays, simulation software applications or executables, or other suitable formats known to those of skill in the art. In some embodiments, the training modules can take the form of a web-based interface performed through an Internet browsing software application running on the agent computing device.

As illustrated in FIG. 20, learning can be delivered as part of a Campaign designed at the Create Learn Campaign step. Designing a learning campaign includes both creating a training module and using the Precision Learning Process and a Precision Coaching Process to identify agents and other provider personnel that need or that could benefit from the training. For instance, the training might be delivered periodically for compliance purposes to those agents or personnel who have yet to complete certain training within a required compliance period. Alternatively, specific training created for newer agents can be delivered to agents with less than a given tenure duration.

The Precision Learning Process can also utilize a Taskability API to deliver training to agents as a specific type of MicroTask called MicroLearning or MicroSim. In this manner, the training is delivered to agents or other provider personnel when there is excess agent capacity relative to the present volume of support requests to avoid interruptions or negative impacts to customer service. As training is completed, the Precision Learning Process updates a database of the training received by the respective individual agents or provider personnel.

Figure 21:
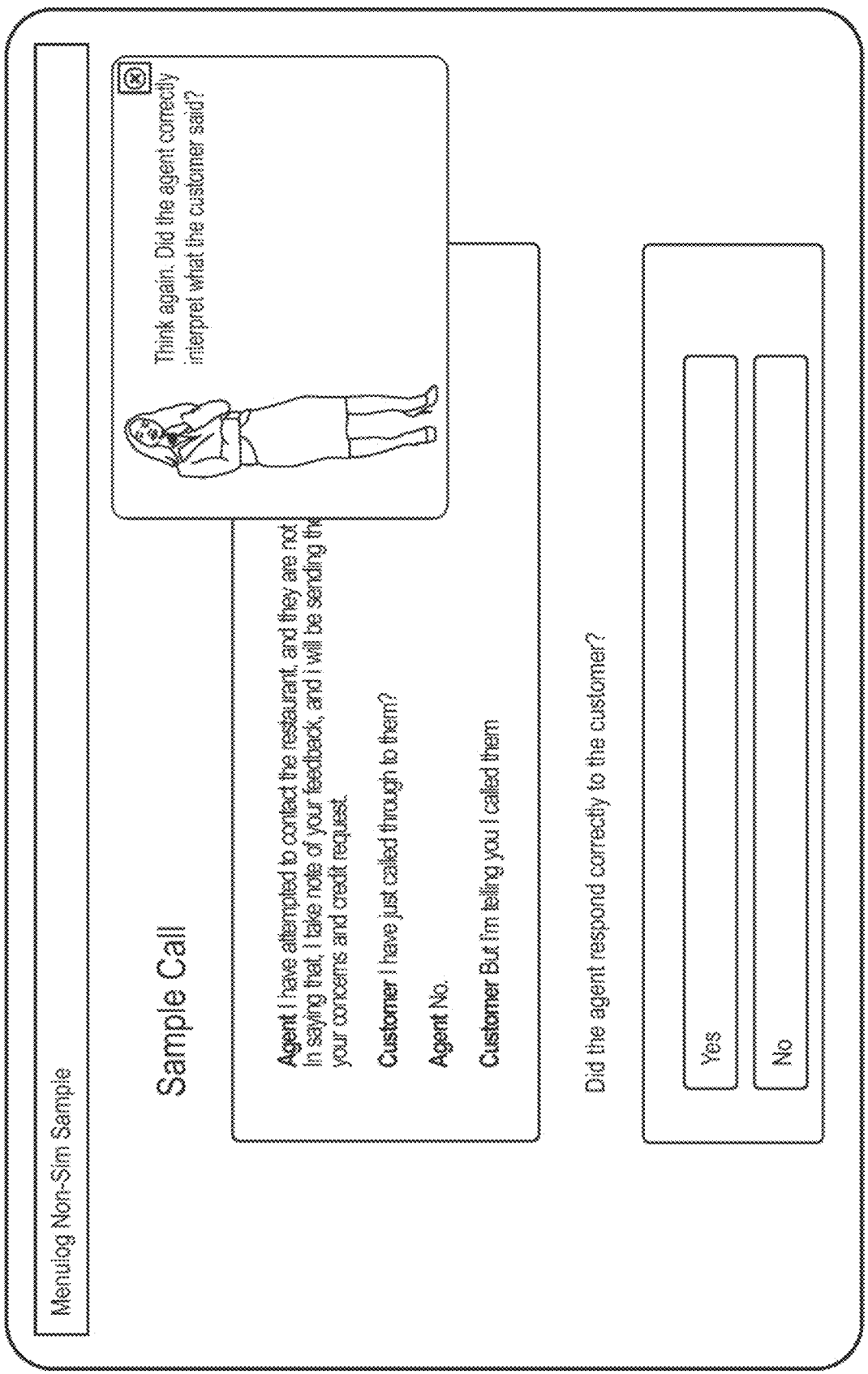
FIG. 21 is an example graphical user interface for a training module.
Figure 22:
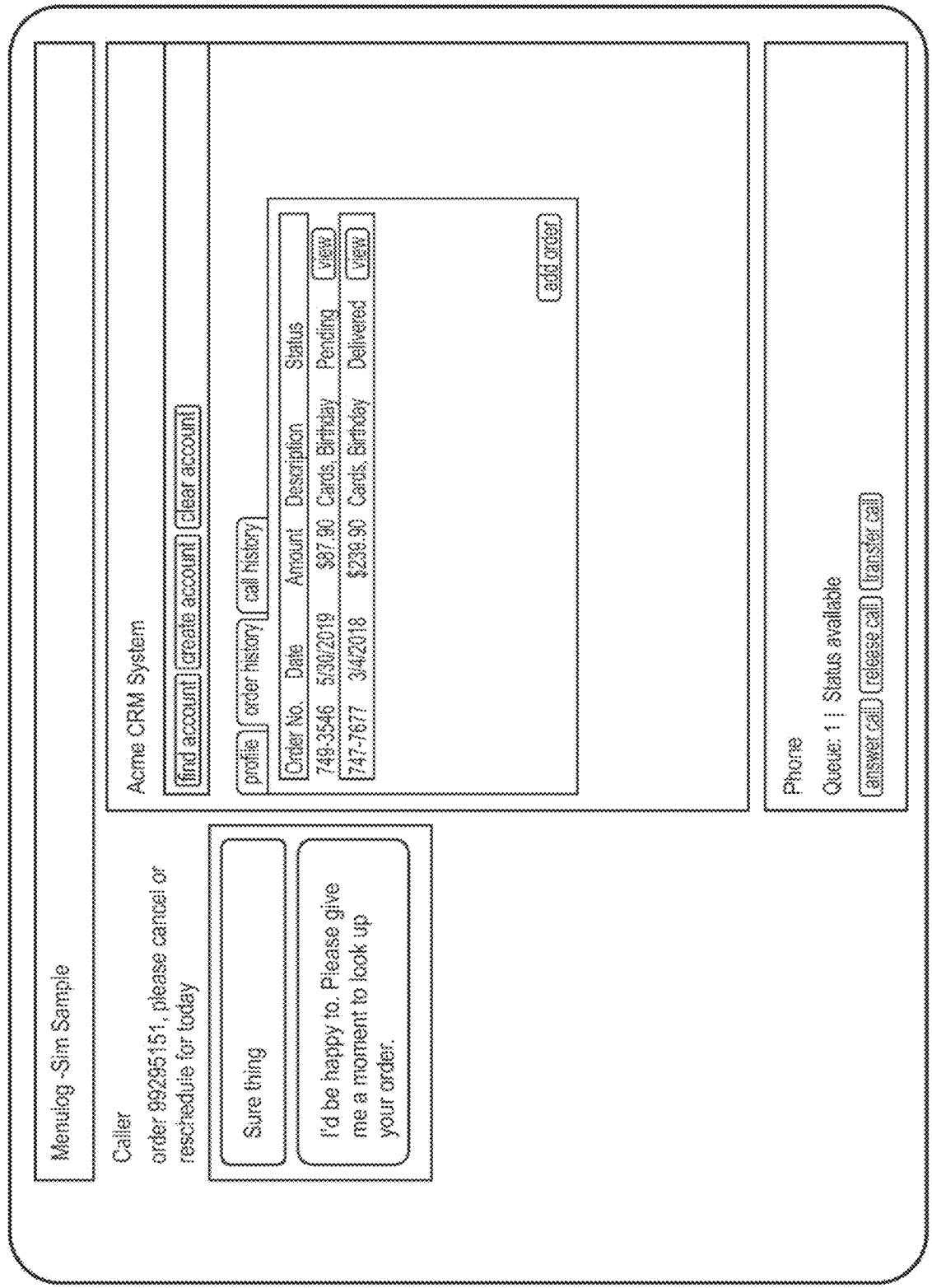
FIG. 22 is a second example graphical user interface for a training module.

FIGS. 21 and 22 depict simplified examples of training modules. FIG. 21 illustrates a question-and-answer type training module that presents an agent with written transcript data from a customer call and asks the viewer to answer a question about the written transcript data. The example shown in FIG. 21 illustrates some potential ambiguity in the customer communication during the share experience, and this type of training could be delivered, for example, to an agent whose Artifact Data has indicated some customer frustration as part of the sentiment data during the Issue Description or Issue Resolution Customer Interaction Segment. In this manner, the agent could receive targeted training in customer communication techniques. FIG. 22 depicts a simulation type training module where an agent can gain experience in searching a customer order history and canceling or rescheduling a customer order.

To facilitate deeper learning, the Precision Learning Process utilizes a Spaced Learning process to reinforce training concepts as well as a Precision Coaching process to help deliver targeted training modules. The Spaced Learning Process reinforces prior learning by delivering at a predetermined time interval (e.g., one hour later, one week later) supplemental training. The supplemental training may be a subset of questions previously presented to and answered by an agent to reinforce prior training concepts, a set of new questions centered on topics addressed in a prior training, or any other type of effective and efficient training module designed to reinforce prior learning. The Spaced Learning Process can deliver supplemental training as a MicroTask using the Taskability API to minimize or avoid interruption to customer service. The supplemental training may also be targeted to agents or other provider personnel that are most in need of the training, such as agents or personnel that struggle with a particular topic that is the subject of the training.

The Precision Coaching Process includes a variety of potential features, such as providing instruction on training questions that were answered incorrectly during a training module or additional instructions for simulation exercises that were not performed correctly or efficiently. The Precision Coaching Process can also evaluate performance during training modules and evaluate training results. The performance and results data is used to develop and deliver subsequent training modules targeted to reinforce concept or topics that yielded poor performance or results during a prior training module.

In some embodiments, the Precision Coaching Process can utilize Performance Monitoring and a Compliance Monitoring Processes as part of identifying and meeting personalized, targeted training needs. For instance, the Precision Coaching Process can be used to developing and delivering training modules targeted to addressing instances of process noncompliance detected by the Compliance Monitoring Process or areas where performance is poor (i.e., low sales, long customer service times). The Performance Monitoring and Compliance Monitoring Processes can use artificial intelligence software applications to monitor agent and personnel compliance and performance as part of delivering targeted, personalized training modules.

Figure 23:
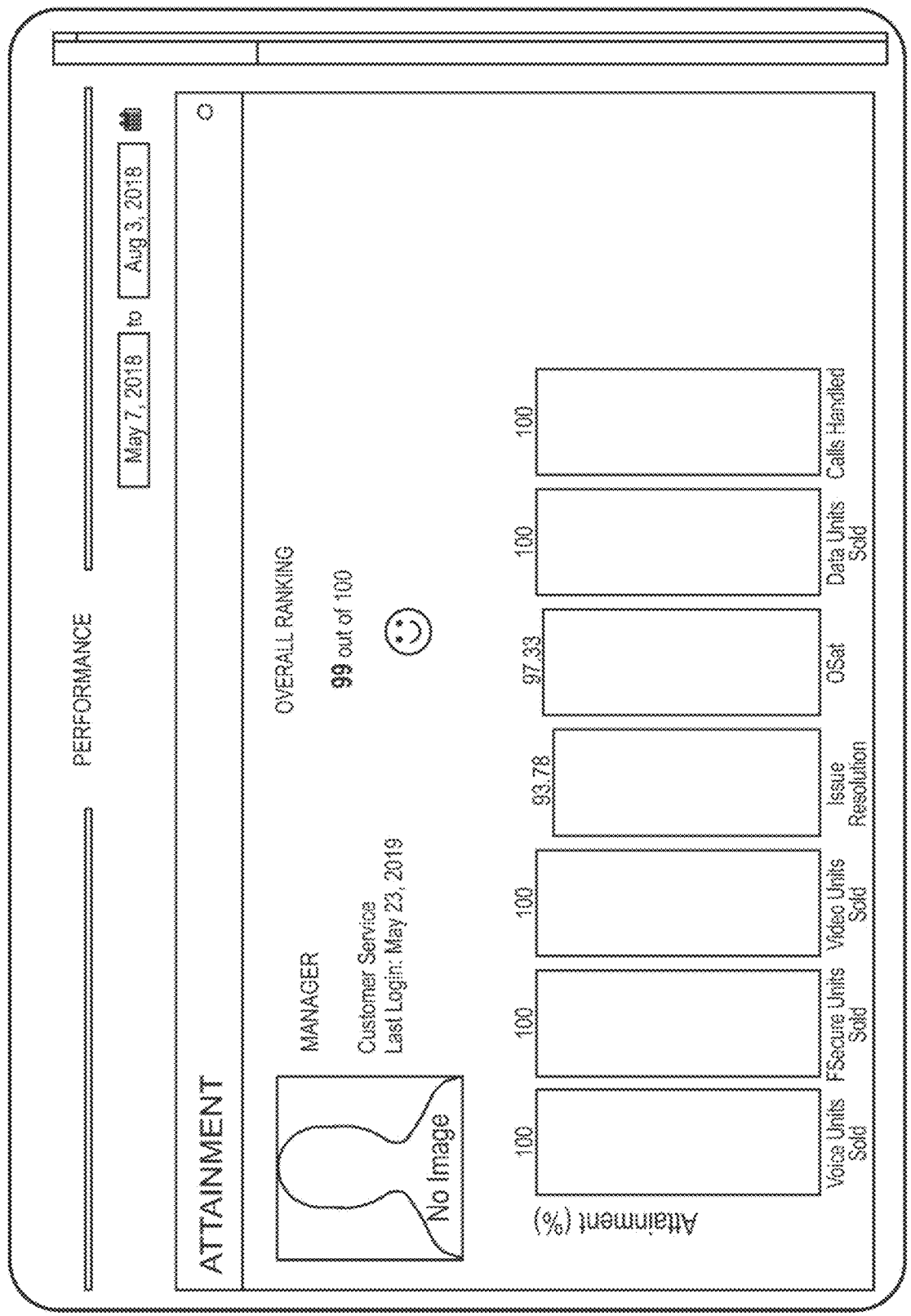
FIG. 23 is an example Agent Performance Dashboard graphical user interface for review and analysis of agent performance.

FIG. 23 illustrates an example Agent Performance Dashboard display interface for providing information regarding agent performance as reflected by gathered Artifact Data. The Performance Monitoring Process evaluates the Artifact Data to identify predetermined categories of Artifact Data known to be useful performance metrics and formats the metrics for display as performance data. Any number or type of performance metrics or data categories can be used, such as shared experience Customer Interaction segment durations (e.g., average time spent on Issue Resolution), sales volumes of particular products, or shared experience/call volumes handled, questions frequently asked by an agent, or the frequency with which certain Tasks are performed. The agent performance data can be used by the Precision Learning Process to deliver targeted training modules, such as delivering training on a particular client product if the agent's sales volumes for that product fall below predetermined thresholds or goals. The agent performance data can be filtered or sorted using a variety of criteria, such as showing performance data over a specified time period.

Figure 24:
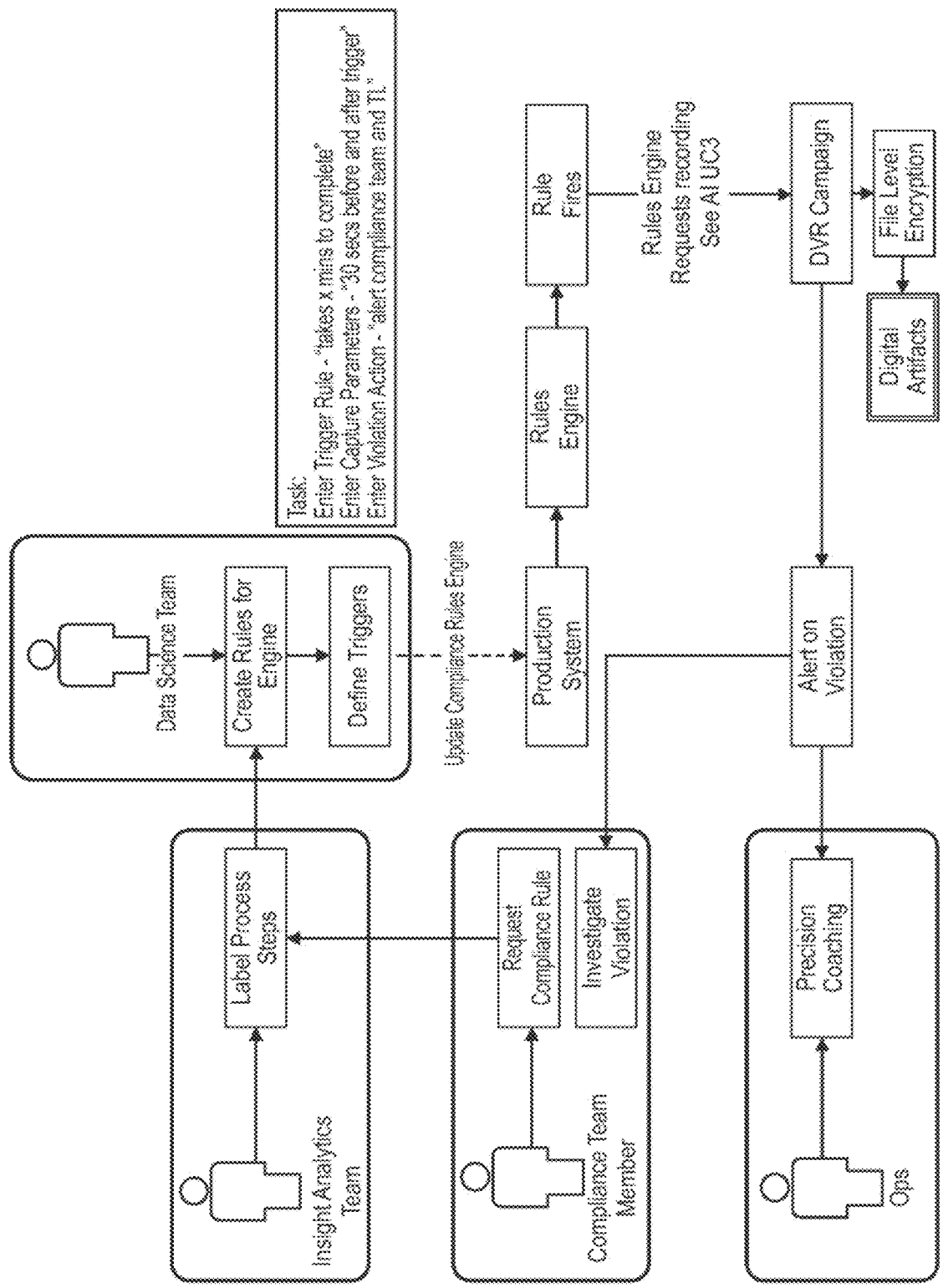
FIG. 24 is an example process flow diagram for Compliance Monitoring.

Precision Coaching can also be delivered based on the results of a Compliance Monitoring Process that monitors for and reports noncompliance with client policies and Processes to ensure such procedures and Processes are followed. FIG. 24 illustrates a process for implementing compliance monitoring that begins with the Request Compliance Rule step. The compliance rule is designed in part through the Label Process Step where the Artifact Data is analyzed and labeled so as to permit detection of instances of Process noncompliance. The labeled Artifact Data is used to create a rule engine at the Create Rules for Engine step followed by the Define Triggers step with capture parameters to define the process Trigger Conditions.

The Compliance Monitoring Process rule engine is integrated into the production Digital Insight system at the Production System and Rules Engine steps of FIG. 24 prior to commencing process compliance monitoring. When a specified Trigger Condition is met and a possible instance of noncompliance detected at the Rule Fire step, the Digital Insight system can capture Artifact Data, including video and audio data, for the given shared experience at the DVR Campaign step. The video and audio are encrypted at the File Level Encryption step and stored as Artifact Data. A Violation Alert is generated at the Alert on Violation step and transmitted to the compliance personnel as well as to the Precision Learning Process to initiate Precision Coaching, as needed.

As an example, it might be determined that following a particular client process for implementing the Opening Customer Interaction segment should take two minutes. In that case a rule might be implemented so that if an Opening takes three minutes, the trigger parameter is met, and the Digital Insights system stores video and audio data from the shared experience. A capture parameter might also specify that video and audio data for the given shared experience is stored for thirty seconds before the Trigger Condition is detected and for thirty seconds after the shared experience ends. The video and audio data is encrypted and stored as Artifact Data. A Violation Alert is generated and sent to the Precision Coaching Process so that a targeted training module is sent to the agent regarding the Opening.

The Compliance Monitoring Process can further include a Production Recommendation analysis that recognizes Trigger Conditions and implements a solution in real-time, such as notifying another agent or a manager through a Violation Alert that an agent needs assistance during a shared experience. One example could include a Trigger Condition that recognizes when a call has been on hold for longer than a predetermined duration of time. In that case, the Production Recommendation analysis could rely on trained neural networking techniques to analyze the Artifact Data and identify a senior agent or manager that has the highest probability of being able to successfully render assistance. Inputs to the Production Recommendation analysis could include an agent and manager's line of business, the client identity, manager availability, agent and/or manager experience, or the customer interaction type, among other relevant categories of Artifact Data. The Production Recommendation analysis could be configured to render other types of outputs as well, such as an output that initiates a Kbot or Cobot as having the highest probability of rendering assistance considering the range of available solutions.

Knowledge Bot and Knowledge Curation

Figure 25:
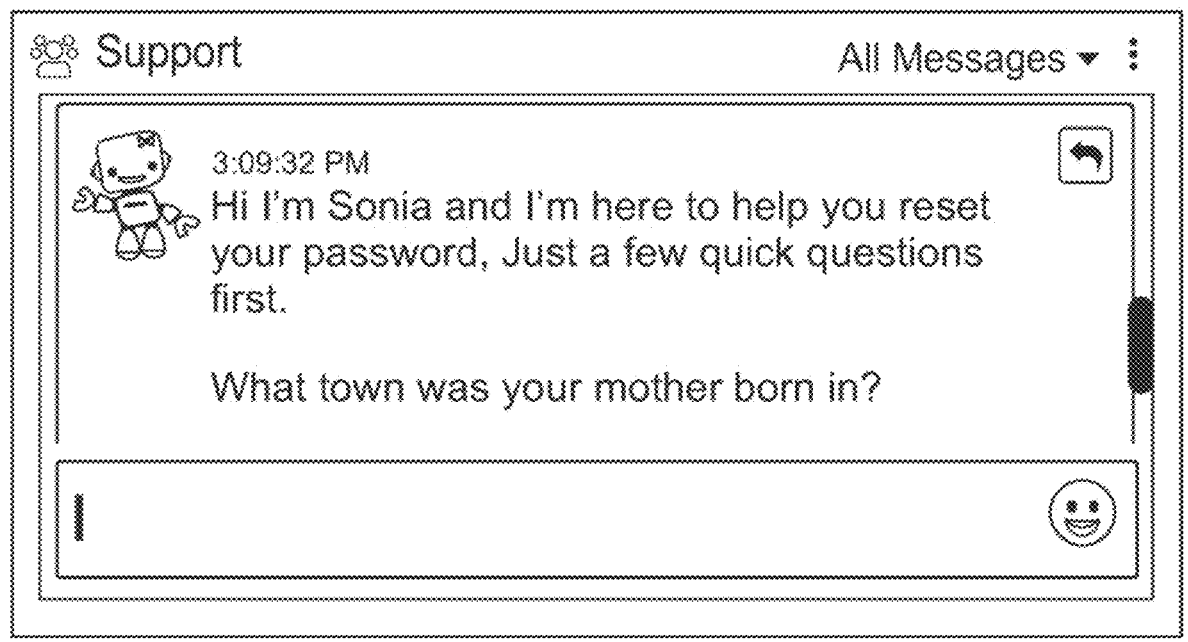
FIG. 25 is an example graphical user interface for a Knowledge Bot.

The Knowledge Bot (Kbot) feature of the Digital Insights systems is designed to assist customers and agents in gathering and providing information as well as completing or even automating tasks. The Kbot can incorporate an interactive chat feature that accepts natural language inputs and answers questions using Artificial Intelligence techniques to identify potential solutions. For example, a customer that is unable to access an online account might ask the Kbot via an instant chat message to reset the customer's password. This could thereby prompt the Kbot to ask the customer a predetermined security question before initiating an email that includes a link for the customer to reset a password. The Kbot can likewise be utilized to provide support for agents, such as answering a technical support or product question. An example Kbot chat interface is depicted in FIG. 25.

The Kbot incorporated with the Digital Insights system has the particular advantage that it is integrated with a comprehensive Knowledge Curation Process that continuously improves the Kbot's ability to accurately find solutions. The Knowledge Curation Process may relies in part on labeled answer and solution pairs stored to a Knowledge Curation database that is searched using Artificial Intelligent techniques to identify the appropriate solutions to issues and questions raised by an agent. The Knowledge Curation Process is depicted in the attached FIG. 26. Agents may submit a question to the Kbot via a chat interface during a shared experience, as indicated in the Ask Question and Question Submitted process steps. The Kbot searches the system database at the Determine Possible Answers step and Returns Possible Answers.

After viewing the Kbot answers, the agent confirms whether the answer was correct or not. If the answer is correct, the process ends at the Agent Answers Yes or Next step, and presumably the requested information was obtained or issue resolved. If the Agent Answers No, the Knowledge Curation process triggers an "I need help Alert" that can be sent to an agent's Team Manager ("TM") to render personnel assistance with the shared experience at the "TM provides necessary support to Agent" step. When the team manager assistance is complete, the team manager utilizes a GUI to mark the assistance as complete and clear the "I need help Alert," which can be indicated by a green color indicator on the team manager's interface.

Figure 27:
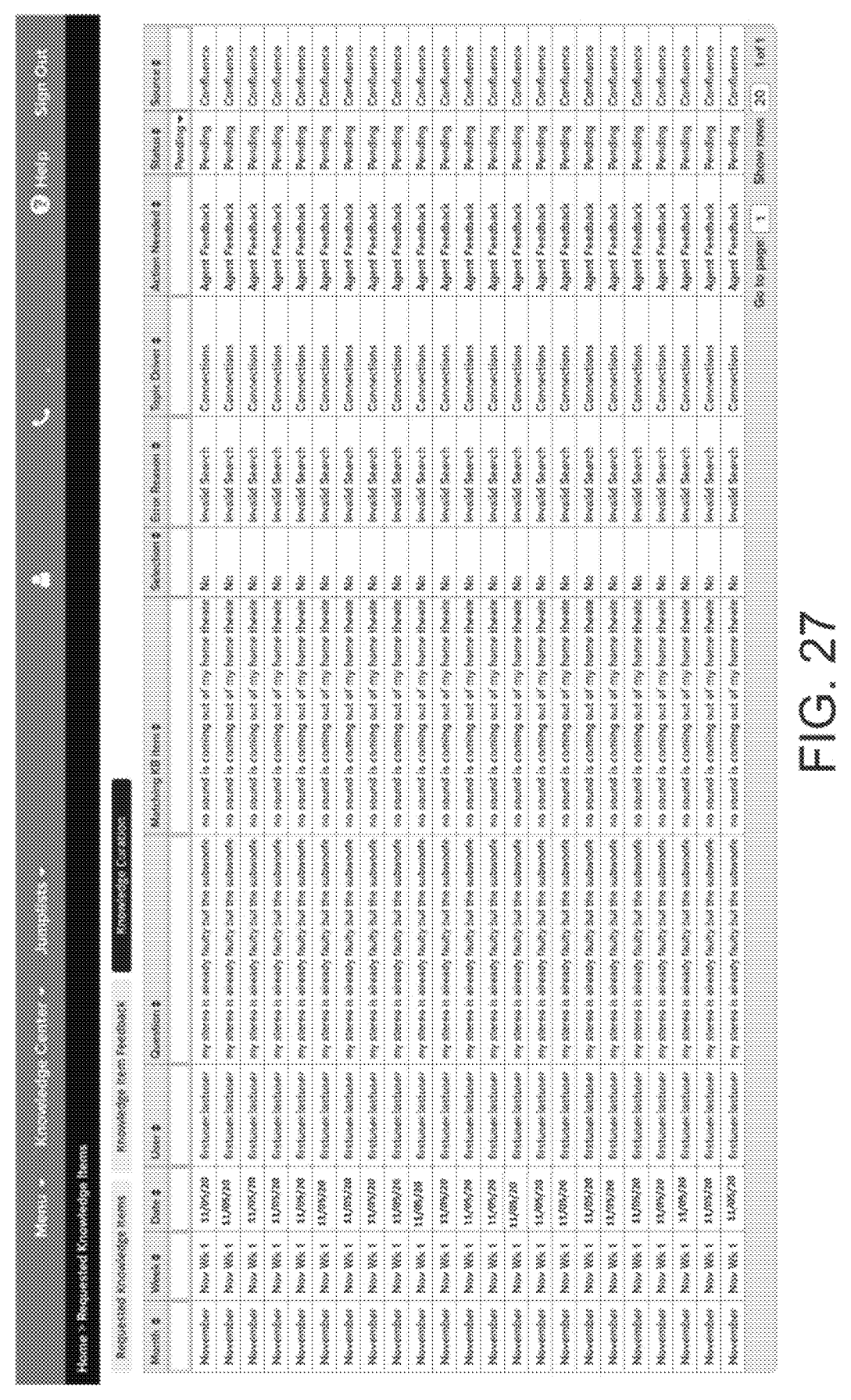

After a shared experience where a team manager's assistance was required because of deficiencies in the Kbot's assistance, the team manager can be requested to input data and information regarding the shared experience and Kbot interaction into a database for further analysis using the example display interface shown in FIG. 27. The Knowledge Curation Process can gather information such as: (1) the date of the shared interaction; (2) the question asked of the Kbot; (3) the Kbot's answer; (4) the agent's answer to the Kbot as to whether the Kbot was correct; (5) a reason for the Kbot's error, if known; (6) the topic or subject matter of the Kbot question; (7) the action required following the error; (8) the source of the actual solution or correct answer to the agent's original question; (9) or any other data and information useful for analyzing the Kbot interaction.

Figure 26:
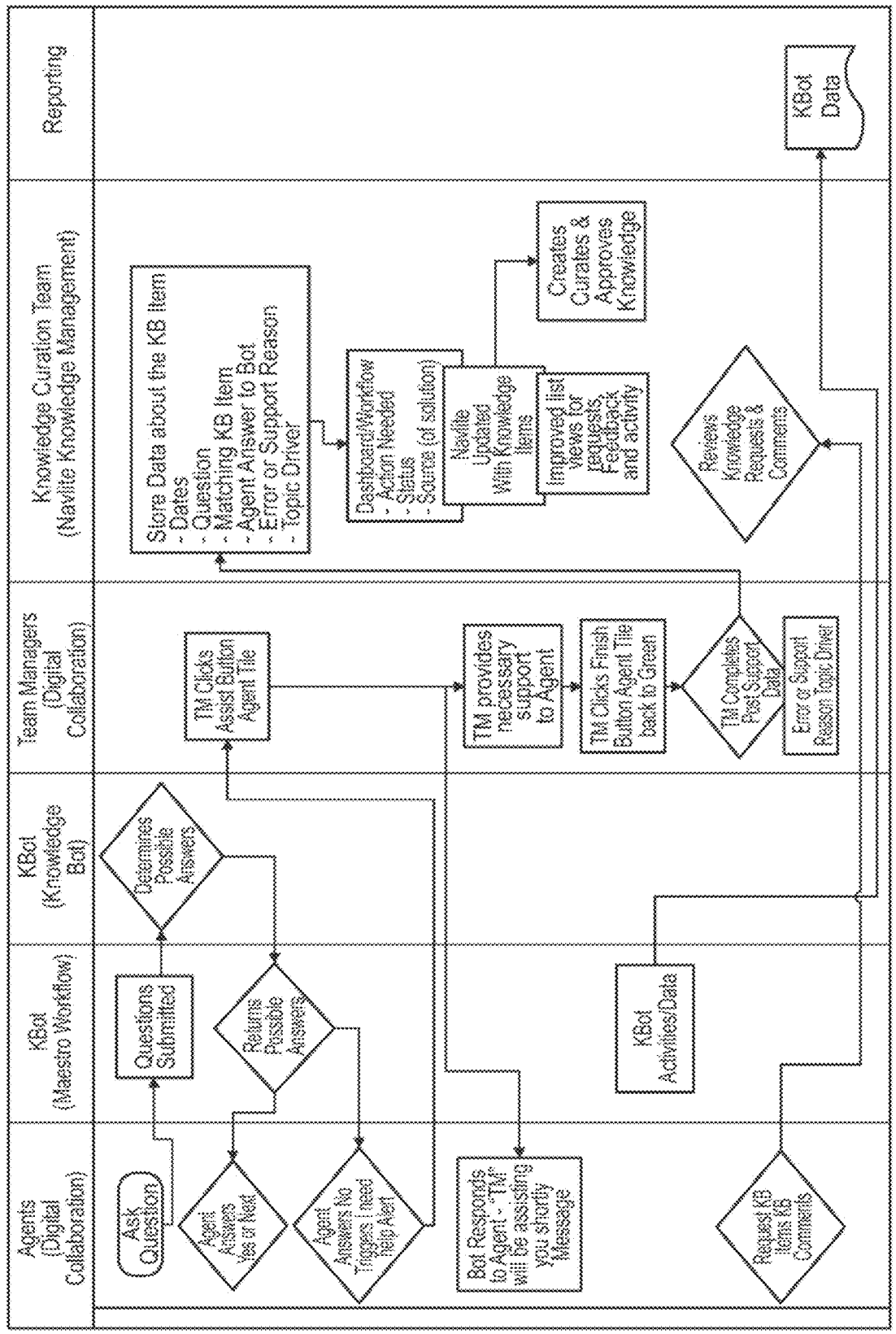
FIG. 26 is an example process flow diagram for Knowledge Curation for improving Knowledge Bot performance.

In addition to the information gathered from the team manager, the Knowledge Curation Process also obtains information from the Kbot software application itself at the Kbot Activities/Data step of FIG. 26. This data can include, for example, the sources reviewed and searched performed by the Kbot, and any error codes returned, among other data and information. The data and information from the Kbot is reviewed at the Reviews Knowledge Request & Comments step. The Kbot data and information is reviewed along with the information from the team manager at the Creates Curates & Approves Knowledge step to update and improve the Kbot's knowledge base and performance. In this manner, future questions posed to the Kbot can be associated with the solution implemented during the prior shared experience.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A computer implemented method for digitizing and analyzing shared experiences comprising the operations of:
   (a) capturing by a provider computing device, Artifact Data that comprises
      (i) event data generated by an event source software application running on at least one agent computing device, and
      (ii) written transcript data that comprises one or a combination of (A) written communication data generated or received by the at least one agent computing device, or (B) transcribed audio data;
   (b) storing the captured Artifact Data to a Digital Artifacts Database as one or more Shared Experience Database Records;
   (c) performing a labeling analysis that associates label data with the one or more Shared Experience Database Records, wherein the label data comprises one or a combination of (i) a Customer Interaction Type identifier, (ii) a Customer Interaction Segment identifier, or (iii) a Process identifier; and
   (d) generating an Opportunity Explorer graphical user interface that displays the Artifact Data and the label data for one or more Shared Experience Database Records, wherein at least part of the Artifact Data and at least part of the label data is displayed as a function of time over the duration of one or more shared experiences;
   (e) generating an Experiment Hypothesis that includes
      (i) a Solution comprising instruction to be implemented by the at least one agent computing device, and
      (ii) a Success Criteria that is satisfied or not satisfied based on the Artifact Data,
   (f) transmitting the Solution to the at least one agent computing device;
   (g) implementing the Solution by the at least one agent computing device by performing the instructions prior to capturing the Artifact Data by the provider computing device;
   (h) processing by hypothesis testing software code, the captured Artifact Data to determine whether the Success Criteria is satisfied; and
   (i) performing a Cost/Benefit Analysis to determine a Return on Investment when the Success Criteria is satisfied.

2. The computer implemented method of claim 1 further comprising the operations of:
   (a) prior transmitting the Solution to the at least one agent computing device, determining by a Taskability API whether the at least one agent computing device is available to implement the Solution; and
   (b) transmitting the Solution as a MicroTask to the at least one agent computing device when the Taskability API determines that the at least one agent computing device is available.

3. The computer implemented method of claim 1, wherein:
   (a) the Artifact Data further comprises video data generated by the at least one agent computing device, and wherein
   (b) capturing by the provider computing device, the video data comprises the operations of
      (i) storing the video data to a DVR Database when initiated by DVR Rules Engine software code that implements Scheduling and Trigger Parameters for capturing video data,
      (ii) applying machine labeling data to the video data,
      (iii) storing the video data and machine labeling data to the Digital Artifacts Database as part of a Shared Experience Database Record.

4. The computer implemented method of claim 1, wherein the Customer Interaction Segment is set to a value that comprises at least one of an Opening Segment, an Issue Description Segment, an Issue Resolution Segment, or a Closing Segment.

5. The computer implemented method of claim 1, further comprising the step of performing, by a Recommendation Engine software process, a recommendation analysis that processes the Artifact Data to output an improvement opportunity recommendation.

6. The computer implemented method of claim 1 further comprising the operations of:
   (a) generating by a Precision Learning Content Creation Tool, a Training Module, wherein the Training Module comprises
      (i) Artifact Data captured by the provider computing device, and
      (ii) instructions to be performed by the agent computing device;
   (b) transmitting the Training Module to a given agent computing device; and
   (c) performing by the given agent computing device, the Training Module instructions.

7. The computer implemented method of claim 6 further comprising the operations of:
   (a) prior transmitting the Training Module to the given agent computing device, determining by a Taskability API whether the given agent computing device is available; and
   (b) transmitting the Training Module to the given agent computing device when the Taskability API determines that the given agent computing device is available.

8. A computer implemented method for digitizing and analyzing shared experience comprising the operation of:
   (a) capturing, by a provider computing device, Artifact Data that comprises
      (i) event data generated by an event source software application running on at least one agent computing device, and
      (ii) written transcript data that comprises one or a combination of (A) written communication data generated or received by the at least one agent computing device, or (B) transcribed audio data;
   (b) storing the captured Artifact Data to a Digital Artifacts Database as one or more Shared Experience Database Records;
   (c) performing a labeling analysis that associates label data with the one or more Shared Experience Database Records, wherein the label data comprises one or a combination of (i) a Customer Interaction Type identified, (ii) a Customer Interaction Segment identifier, or (iii) a Process identifier, and
   (d) generating an Opportunity Explorer graphical user interface that displays the Artifact Data and the label data for one or more Shared Experience Database Records, wherein at least part of the Artifact Data and at least part of the label data is displayed as a function of time over the duration of one or more shared experiences,
   (e) generating an Experiment Hypothesis that includes
      (i) a Solution comprising instruction to be implemented by the at least one agent computing device, wherein the Solution comprises a Robotic Process Automation software module that automates one or more tasks performed by the agent computing device, and (ii) a Success Criteria that is satisfied or not satisfied based on the Artifact Data, wherein when the Success Criteria is satisfied, the Robotic Process Automation software module is integrated with the provider computing device and transmitted to agent computing devices during shared experiences;

(f) transmitting the Solution to the at least one agent computing device;

(g) implementing the Solution by the at least one agent computing device by performing the instructions prior to capturing the Artifact Data by the provider computing device; and (h) processing by hypothesis testing software code, the captured Artifact Data to determine whether the Success Criteria is satisfied.

9. A computer implemented method for digitizing and analyzing shared experiences comprising the operations of:

(a) capturing by a provider computing device, Artifact Data that comprises
  (i) event data generated by an event source software application running on at least one agent computing device, and
  (ii) written transcript data that comprises one or a combination of (A) written communication data generated or received by the at least one agent computing device, or (B) transcribed audio data;

(b) storing the captured Artifact Data to a Digital Artifacts Database as one or more Shared Experience Database Records;

(c) performing a labeling analysis that associates label data with the one or more Shared Experience Database Records, wherein
  (i) the label data comprises one or a combination of (A) a Customer Interaction Type identifier, (B) a Customer Interaction Segment identifier, or (C) a Process identifier, and wherein
  (ii) Customer Interaction Type Identifier and the Customer Interaction Segment identifier are determined through a neural networking analysis;

(d) generating an Opportunity Explorer graphical user interface that displays the Artifact Data and the label data for one or more Shared Experience Database Records, wherein at least part of the Artifact Data and at least part of the label data is displayed as a function of time over the duration of one or more shared experiences.

10. A computer implemented method for digitizing and analyzing shared experiences comprising the operations of:

(a) capturing by a provider computing device, Artifact Data that comprises
  (i) event data generated by an event source software application running on at least one agent computing device, and
  (ii) written transcript data that comprises one or a combination of (A) written communication data generated or received by the at least one agent computing device, or (B) transcribed audio data;

(b) storing the captured Artifact Data to a Digital Artifacts Database as one or more Shared Experience Database Records, (c) performing a labeling analysis that associates label data with the one or more Shared Experience Database Records, wherein the label data comprises one or a combination of (i) a Customer Interaction Type identifier, (ii) a Customer Interaction Segment identifier, or (iii) a Process identifier;

(d) generating an Opportunity Explorer graphical user interface that displays the Artifact Data and the label data for one or more Shared Experience Database Records, wherein at least part of the Artifact Data and at least part of the label data is displayed as a function of time over the duration of one or more shared experiences;

(e) generating by a Precision Learning Content Creation Tool, a plurality of Initial Training Modules and Targeted Training Modules, wherein the Initial Training Modules and Targeted Training Modules both comprise
  (i) Artifact Data captured by the provider computing device, and
  (ii) instructions to be performed by the agent computing device;

(f) transmitting an Initial Training Module to a given agent computing device;

(g) performing by the given agent computing device, the Initial Training Module instructions;

(h) evaluating and storing training results data generated during performance of the Initial Training Module by the given agent computing device, (i) selecting by Precision Coaching software code, a given Targeted Training Module based on the training results data; and (j) transmitting the given Targeted Training Module to a given agent computing device.

11. A computer implemented method for digitizing and analyzing shared experiences comprising the operations of:

(a) capturing by a provider computing device, Artifact Data that comprises
  (i) event data generated by an event source software application running on at least one agent computing device, and
  (ii) written transcript data that comprises one or a combination of (A) written communication data generated or received by the at least one agent computing device, or (B) transcribed audio data;

(b) storing the captured Artifact Data to a Digital Artifacts Database as one or more Shared Experience Database Records;

(c) performing a labeling analysis that associates label data with the one or more Shared Experience Database Records, wherein the label data comprises one or a combination of (i) a Customer Interaction Type identifier, (ii) a Customer Interaction Segment identifier, or (iii) a Process identifier; and (d) generating an Opportunity Explorer graphical user interface that displays the Artifact Data and the label data for one or more Shared Experience Database Records, wherein
  (i) at least part of the Artifact Data and at least part of the label data is displayed as a function of time over the duration of one or more shared experiences, and wherein
  (ii) the Artifact Data further comprises Kbot Data generated by the at least one agent computing device interfacing with a Knowledge Bot software application, and wherein
  (iii) the method further comprises the operations of
    (A) performing a knowledge curation process that associates the Kbot Data with Shared Experience Resolution Data, (B) storing the Kbot Data, Shared Experience Resolution Data, and at least part of the Artifact Data to a Kbot Knowledge Curation Database.

12. A computer implemented method for digitizing and analyzing shared experiences comprising the operations of:
    (d) capturing by a provider computing device, Artifact Data that comprises
        (i) event data generated by the operations comprising
            (A) receiving by a global transaction ingress API (GTI API), telemetry data packets, wherein the telemetry data packets are generated utilizing telemetry data from an event source software application running on at least one agent computing device,
            (B) performing by the GTI API, a transaction analysis that correlates the telemetry data packets into transactions that represent a series of related activities performed by the at least one agent computing device,
        (ii) written transcript data that comprises one or a combination of (A) written communication data generated or received by the at least one agent computing device, or (B) transcribed audio data;
    (e) storing the captured Artifact Data to a Digital Artifacts Database as one or more Shared Experience Database Records;
    (f) performing a labeling analysis that applies label data to one or more Shared Experience Database Records by storing the label data to the one or more Shared Experience Database Records, wherein the label data comprises one or a combination of (i) a Customer Interaction Type identifier, (ii) a Customer Interaction Segment identifier, or (iii) a Process identifier;
    (g) performing a compliance monitoring process comprising the operations of
        (i) providing Compliance Rules Engine software code configured to recognize the presence of at least one Trigger Condition in the Artifact Data,
        (ii) processing by the Compliance Rules Engine software code, the one or more Shared Experience Database Records to determine the presence of the at least one Trigger Condition in the Artifact Data, and
        (iii) generating an Alert when at least one Trigger Condition is present.

13. The computer implemented method of claim 12 further comprising the operations of:
    (d) when the at least one Trigger Condition is present in Artifact Data stored to a given Shared Experience Database Record, the provider computing device determines a given agent computing device from which the Artifact Data stored to the given Shared Experience Database Record was captured; and
    (e) capturing by the provider computing device, video data generated by the given agent computing device, wherein capturing the video data comprises the operations of
        (i) applying a Tag Clip Identifier to the video data,
        (ii) applying machine labeling data to the video data,
        (iii) applying timecode data to the video data, and
        (iv) storing the video data, Tag Clip Identifier, machine labeling data, and timecode data to the Digital Artifacts Database as part of the given Shared Experience Database Record.

14. The computer implemented method of claim 12 further comprising the operations of:
    (d) generating by a Precision Learning Content Creation Tool, a Training Module that incorporates Artifact Data captured by the provider computing device and instructions to be performed by the at least one agent computing device;
    (e) when the at least one Trigger Condition is present in Artifact Data stored to a given Shared Experience Database Record, determining by the provider computing device, a given agent computing device from which the Artifact Data stored to the given Shared Experience Database Record was captured; and
    (f) transmitting the Training Module to the given agent computing device.

15. The computer implemented method of claim 12 further comprising the operations of:
    (d) generating by a Precision Learning Content Creation Tool, a plurality of Targeted Training Modules that incorporate Artifact Data captured by the provider computing device and instructions to be performed by the at least one agent computing device;
    (e) when the at least one Trigger Condition is present in Artifact Data stored to a given Shared Experience Database Record, determining by the provider computing device, a given agent computing device from which the Artifact Data stored to the given Shared Experience Database Record was captured;
    (f) selecting by Precision Coaching software code, a given Targeted Training Module based on the at least one Trigger Condition present in Artifact Data stored to the given Shared Experience Database Record; and
    (g) transmitting the given Targeted Training Module to the given agent computing device.

16. The computer implemented method of claim 15 further comprising the operations of:
    (d) prior transmitting the Targeted Training Module to the given agent computing device, determining by a Taskability API whether the given agent computing device is available; and
    (e) transmitting the Targeted Training Module to the given agent computing device when the Taskability API determines that the given agent computing device is available.

17. The computer implemented method of claim 15, wherein the instructions to be performed by the given agent computing device that implement a shared experience simulation.

18. The computer implemented method of claim 12 further comprising the operation of performing, by a Production Recommendation software process, a recommendation analysis that processes the Artifact Data and Trigger Condition using machine learning techniques and outputs a recommendation.

19. The computer implemented method of claim 18, wherein the recommendation output comprises the selection of a provider personnel and the method further comprises the operation of transmitting an alert to the provider personnel.

* * * * *